(12) United States Patent
Doi

(10) Patent No.: US 8,472,561 B2
(45) Date of Patent: Jun. 25, 2013

(54) RECEIVER CIRCUIT

(75) Inventor: Yoshiyasu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 13/155,485

(22) Filed: Jun. 8, 2011

(65) Prior Publication Data
US 2012/0020399 A1 Jan. 26, 2012

(30) Foreign Application Priority Data
Jul. 21, 2010 (JP) ................................ 2010-164272

(51) Int. Cl.
*H03K 9/00* (2006.01)
*H04L 27/00* (2006.01)

(52) U.S. Cl.
USPC .......................................... 375/316; 375/346

(58) Field of Classification Search
USPC ......... 375/316, 346, 355, 359–360, 375–376, 375/340; 713/400–601
See application file for complete search history.

(56) References Cited

U.S. PATENT DOCUMENTS

| 6,122,335 A * | 9/2000 | Colella et al. ............... 375/355 |
| 6,269,137 B1 * | 7/2001 | Colella et al. ............... 375/355 |
| 6,545,626 B1 | 4/2003 | Nakada |
| 7,693,214 B2 | 4/2010 | Shida |
| 2010/0220828 A1 * | 9/2010 | Fuller et al. ............... 375/355 |

FOREIGN PATENT DOCUMENTS

| JP | 2002-100988 | 4/2002 |
| JP | 2005-348156 A | 12/2005 |

* cited by examiner

*Primary Examiner* — Jean B Corrielus
(74) *Attorney, Agent, or Firm* — Fujitsu Patent Center

(57) ABSTRACT

A receiver circuit includes: a first sampling circuit to sample input data in synchronization with a first edge of a sampling clock signal; a second sampling circuit to sample the input data in synchronization with a second edge of the sampling clock signal; a duty-cycle-distortion detection circuit to detect a duty-cycle-distortion amount indicating an error in a duty ratio of the sampling clock signal based on first data which is sampled by the first sampling circuit and second data which is sampled by the second sampling circuit; a correction circuit to correct the first data or the second data to generate first corrected data or second corrected data, respectively, based on the duty-cycle-distortion amount; and a clock data recovery circuit to select data out of the first corrected data and the second data and to recover the selected data.

11 Claims, 24 Drawing Sheets

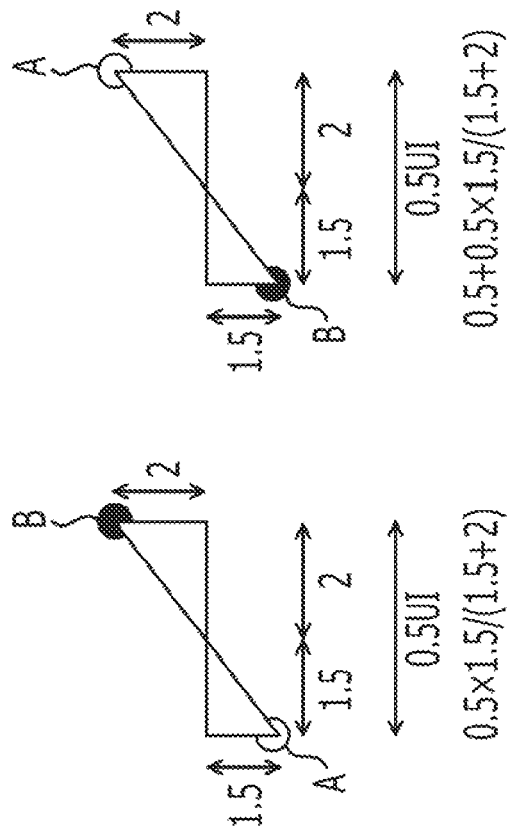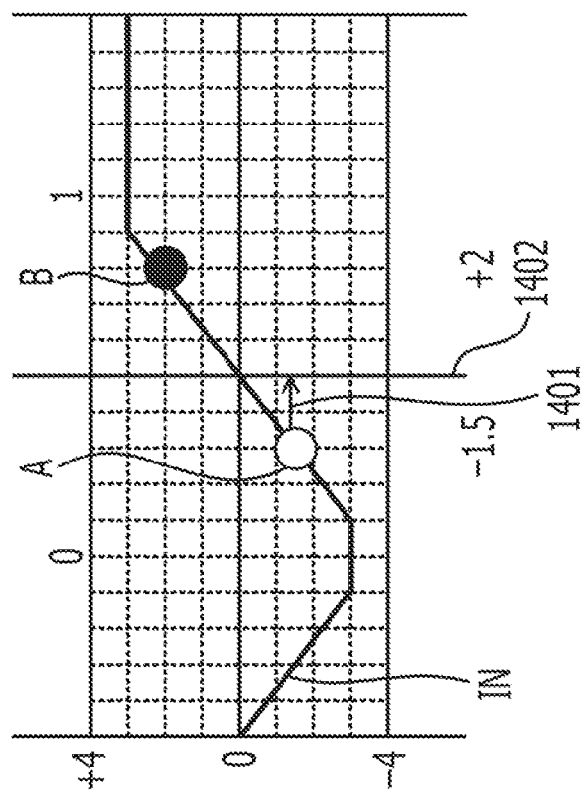

RECEIVER CIRCUIT

CROSS-REFERENCE TO RELATED APPLICATIONS

This application claims the benefit of priority from Japanese Patent Application No. 2010-164272 filed on Jul. 21, 2010, the entire contents of which are incorporated herein by reference.

BACKGROUND

1. Field

Embodiments discussed herein relate to a receiver circuit.

2. Description of Related Art

High-speed interface receiver circuits having analog-to-digital converters arranged at input stages recover data by a digital signal process. The circuits arranged at the input stages of the receiver circuits may perform time interleave to increase the operating margins of the circuits without changing the effective operating frequencies. For example, the frequency of clock signals is halved, two circuits are provided at the input stage of a receiver circuit, and the two circuits operate at rising edges and falling edges of the clock signals.

Related art is disclosed in, for example, Japanese Unexamined Patent Application Publication No. 2002-100988 and Japanese Unexamined Patent Application Publication No. 2005-348156.

SUMMARY

According to one aspect of the embodiments, a receiver circuit includes: a first sampling circuit to sample input data in synchronization with a first edge of a sampling clock signal; a second sampling circuit to sample the input data in synchronization with a second edge of the sampling clock signal; a duty-cycle-distortion detection circuit to detect a duty-cycle-distortion amount indicating an error in a duty ratio of the sampling clock signal based on first data which is sampled by the first sampling circuit and second data which is sampled by the second sampling circuit; a correction circuit to correct the first data or the second data to generate first corrected data or second corrected data, respectively, based on the duty-cycle-distortion amount; and a clock data recovery circuit to select data out of the first corrected data and the second data and to recover the selected data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 14A to 14C illustrate an exemplary estimation of a zero crossing phase;

DESCRIPTION OF EMBODIMENTS

Figure 1:
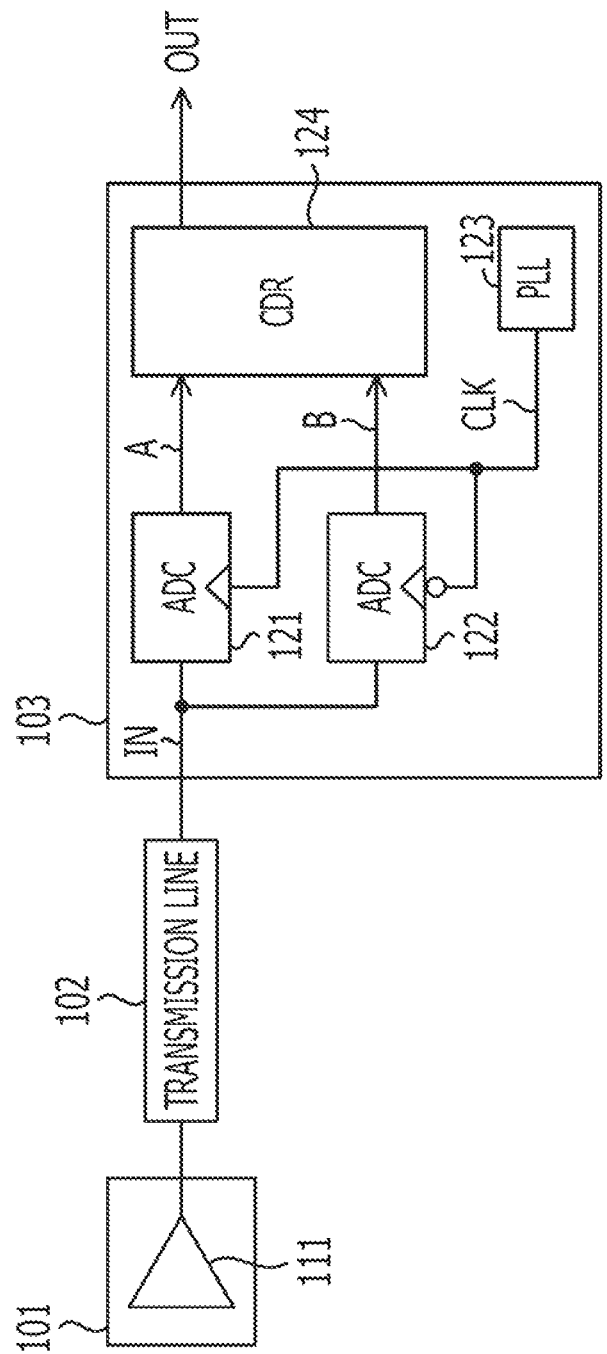
FIG. 1 illustrates an exemplary communication system.

FIG. 1 illustrates an exemplary communication system. Referring to

FIG. 1, the communication system includes a transmitter circuit 101 and a receiver circuit 103. The transmitter circuit 101 is coupled to the receiver circuit 103 via a transmission line 102, such as a printed wiring board. The transmitter circuit 101 includes a driver 111. The receiver circuit 103 includes a first analog-to-digital converter (ADC) 121, a second analog-to-digital converter (ADC) 122, a phase locked loop (PLL) circuit 123, and a clock data recovery (CDR) circuit 124.

The transmitter circuit 101 transmits data IN via the transmission line 102 in synchronization with a clock signal from an oscillator. The data IN may be digital data on which the clock signal is superimposed. One unit interval (1 UI) is a duration time of one data bit in the data IN and may be one period of a bit clock. The boundary of one unit interval may be a changing point of the data.

The phase locked loop circuit 123 generates a sampling clock signal CLK. The first analog-to-digital converter 121 samples the voltage levels of the analog data IN in synchronization with rising edges of the sampling clock signal CLK to output digital data A of multiple bits. The second analog-to-digital converter 122 samples the voltage levels of the analog data IN in synchronization with falling edges of the sampling clock signal CLK to output digital data B of multiple bits.

The clock data recovery circuit 124 estimates the phase at which the input data IN has a voltage level of zero as a boundary of one unit interval based on the digital data A and digital data B. The phase at an instant at which data having values of "0" and "1" is across a threshold voltage (for example, 0 V) may be referred to as a zero crossing phase.

Since the input data IN is input at random in a certain time period, the boundary of one unit interval may be estimated by processing unit intervals in a plurality of periods. The clock data recovery circuit 124 selects data, which is closer to a center of one unit interval, among the digital data A and the digital data B, for every unit interval to recover the selected data. For example, the clock data recovery circuit 124 recovers one-bit data OUT of "1" when the selected digital data A or B is larger than zero and recovers one-bit data OUT of "0" when the selected digital data A or B is smaller than zero.

Figure 2:
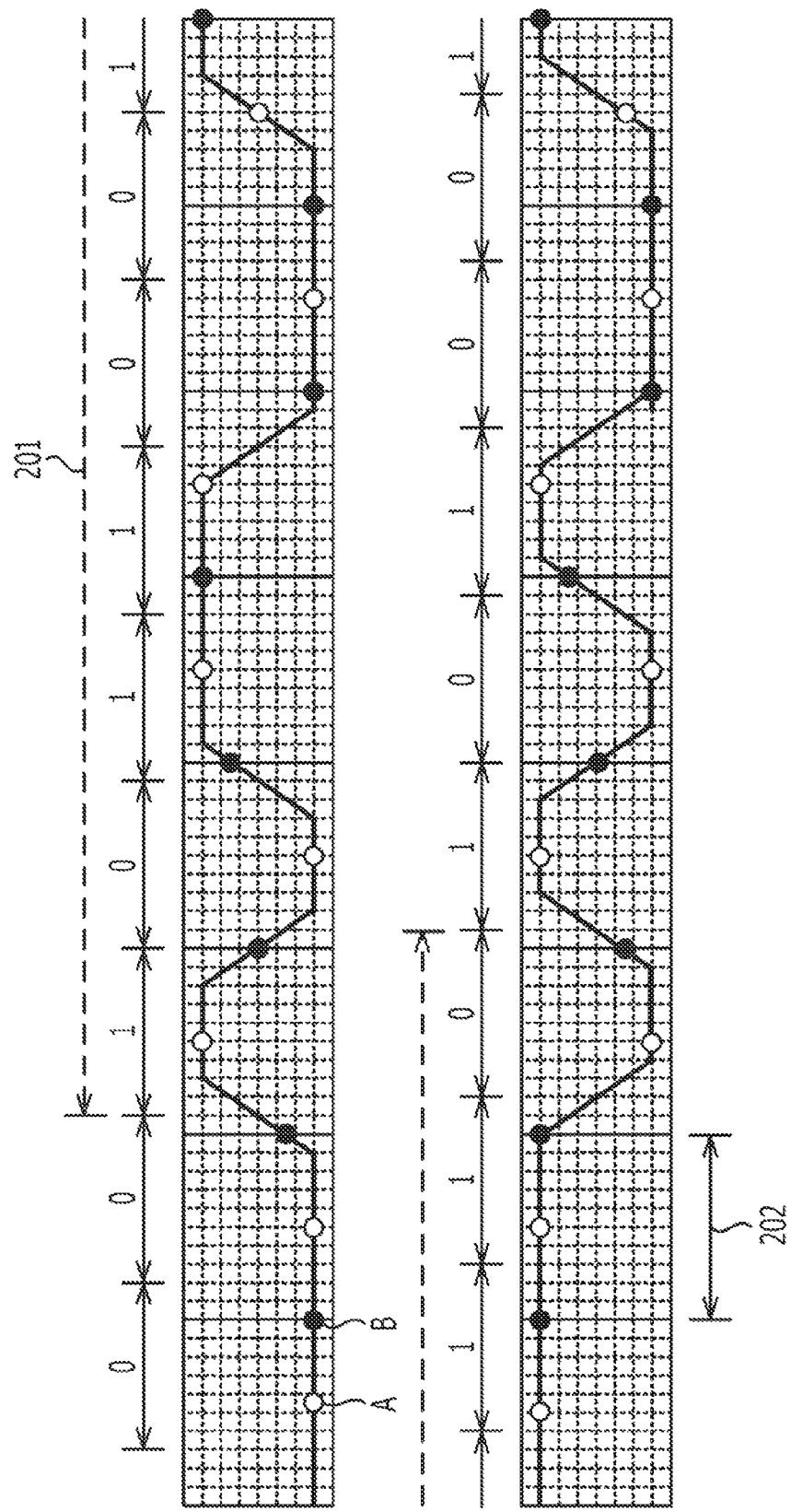
FIG. 2 illustrates an exemplary frequency.

FIG. 2 illustrates an exemplary frequency. A shift in frequency between the input data IN and the sampling clock signal CLK is illustrated in FIG. 2. The digital data A indicates the input data IN that is sampled in synchronization with the rising edges of the sampling clock signal CLK. The digital data B indicates the input data IN that is sampled in synchronization with the falling edges of the sampling clock signal CLK. The input data IN includes a value of "zero" or "one" for every unit interval. The input data IN of one period 201 may be of 10 bits. One period 202 corresponds to one period of the sampling clock signal CLK and is different from the period of one unit interval. The shift in frequency between the input data IN and the sampling clock signal CLK may be 10%. One period 201 may be one period in the relationship between the input data IN and the sampling clock signal CLK. The relationship between the input data IN and the sampling clock signal CLK is returned to the original state in 10 bits. The shift in frequency may be about 100 pulses per minute (ppm) to 600 ppm.

Figure 3:
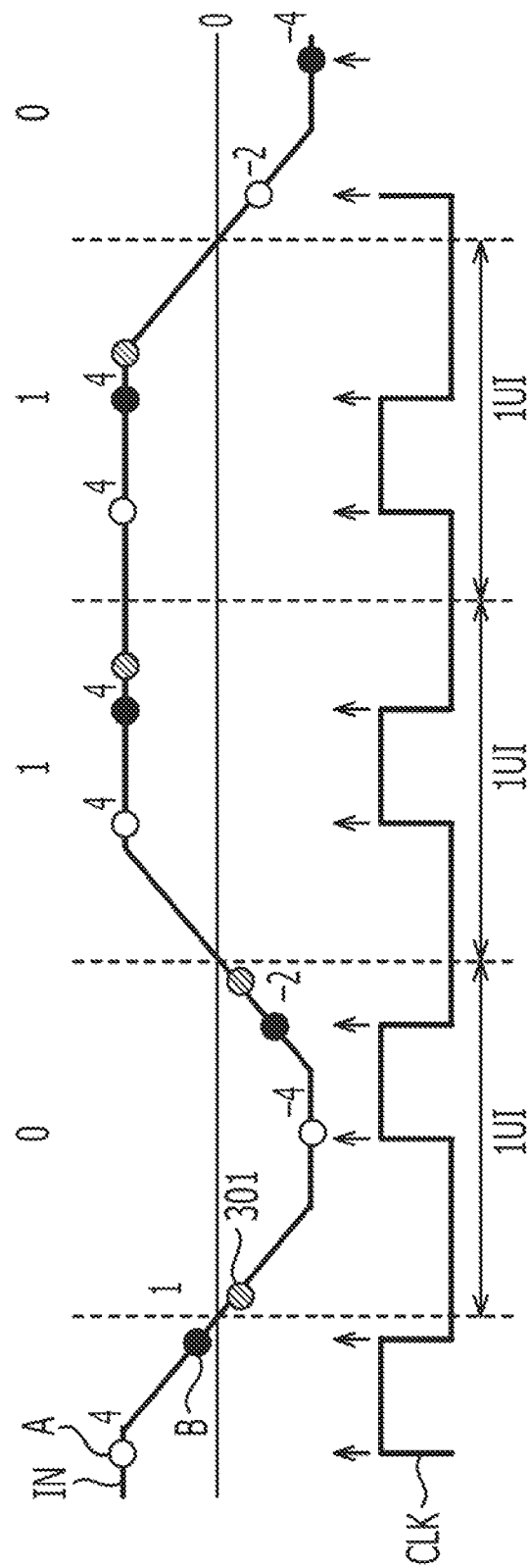
FIG. 3 illustrates an exemplary duty cycle distortion (DCD)

FIG. 3 illustrates an exemplary duty cycle distortion (DCD). Since the sampling clock signal CLK generated by the phase locked loop circuit 123 is transmitted by a buffer, the pulse width may be decreased due to a variation in temperature or voltage. For example, the duty ratio of the sampling clock signal CLK may be 50%. However, the duty ratio of the sampling clock signal CLK may be smaller than 50% due to the DCD. The digital data B is sampled in synchronization with the falling edges of the sampling clock signal CLK having the DCD. Digital data 301 is sampled based on the sampling clock signal CLK having no DCD. The sampling interval may not be substantially constant due to the DCD. Accordingly, an error may occur in the estimation of the zero crossing phase.

Figure 4:
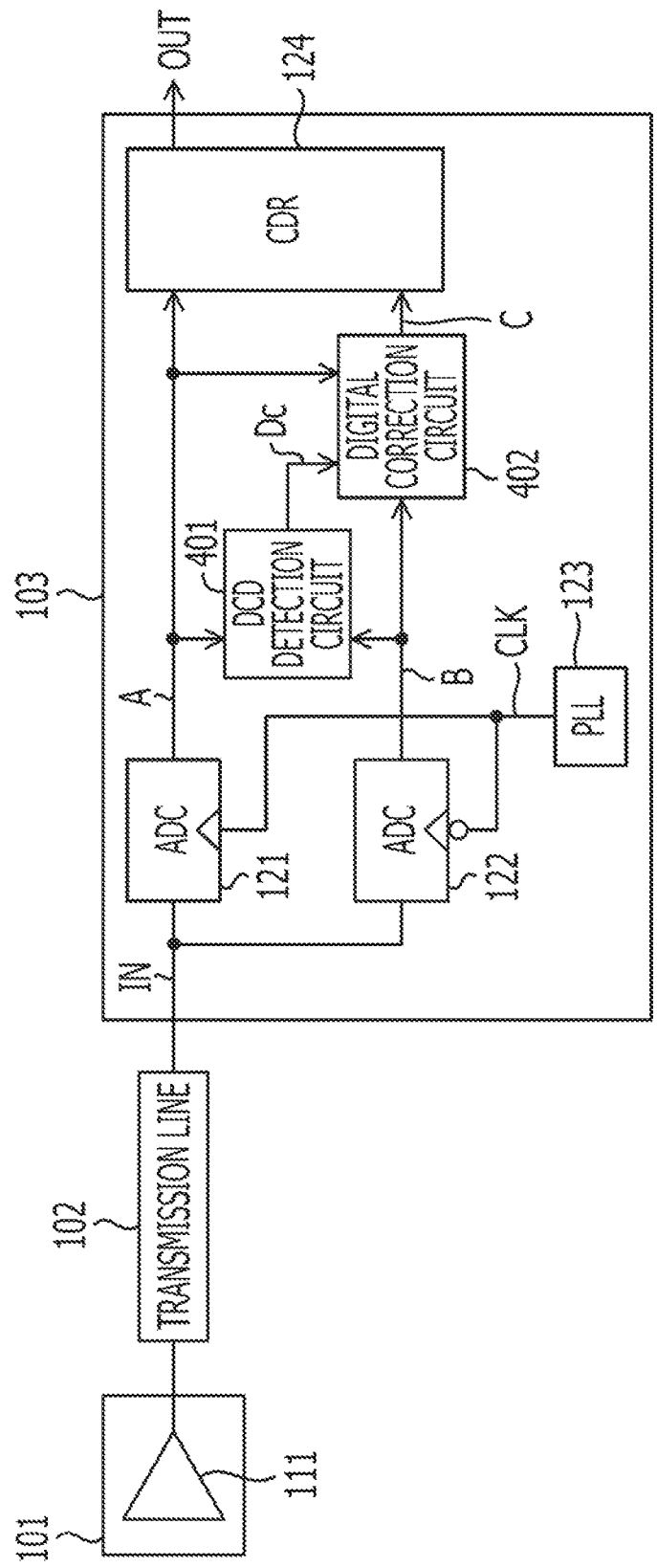
FIG. 4 illustrates an exemplary communication system.

FIG. 4 illustrates an exemplary communication system. Referring to FIG. 4, the communication system includes a high-speed interface transmitter circuit 101 and a receiver circuit 103. The transmitter circuit 101 is coupled to the receiver circuit 103 via a transmission line 102, such as a printed wiring board. The transmitter circuit 101 includes a driver 111. The receiver circuit 103 includes a first analog-to-digital converter (ADC) 121, a second analog-to-digital converter (ADC) 122, a phase locked loop (PLL) circuit 123, a clock data recovery (CDR) circuit 124, a duty cycle distortion (DCD) detection circuit 401, and a digital correction circuit 402.

Figure 5:
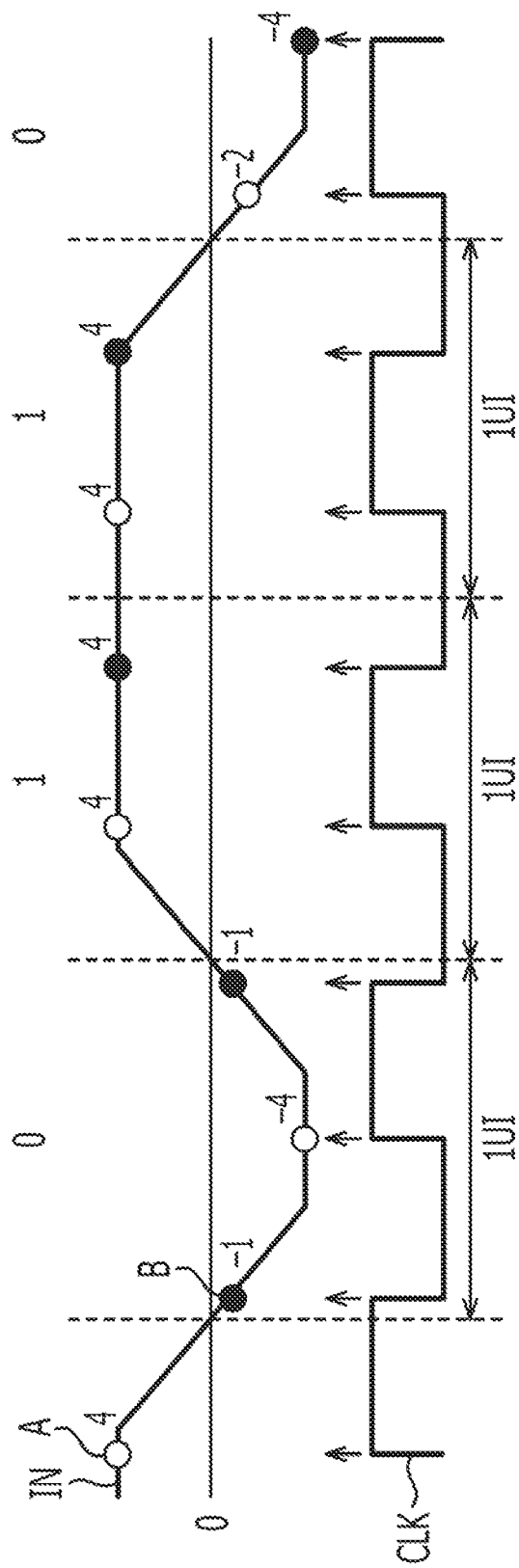
FIG. 5 illustrates an exemplary operation of a communication system.

FIG. 5 illustrates an exemplary operation of a communication system. The transmitter circuit 101 transmits data IN over the transmission line 102 in synchronization with a clock signal from its own oscillator. The data IN may be digital data on which the clock signal is superimposed. One unit interval (1 UI) is the duration time of one data bit of the data IN and may correspond to one period of a bit clock. The boundary of one unit interval may be a point when the data is changed.

The phase locked loop circuit 123 generates a sampling clock signal CLK. The first analog-to-digital converter 121 samples the analog data IN in synchronization with rising edges of the sampling clock signal CLK to output digital data A of multiple bits. The second analog-to-digital converter 122 samples the analog data IN in synchronization with falling edges of the sampling clock signal CLK to output digital data B of multiple bits. Referring to FIG. 5, white circles (○) indicate the digital data A and black circles (●) indicate the digital data B. The same applies to the other drawings. The digital data A and the digital data B at "−4" correspond to the data IN having a value of "0", and the digital data B and the digital data B at "+4" correspond to the data IN having a value of "1." The first and second analog-to-digital converters 121 and 122 each perform double-sampling on the data IN by an interleave method.

A minute shift in frequency may occur between the transmitter circuit 101 and the receiver circuit 103 that operate asynchronously with each other even when the transmitter circuit 101 has substantially the same specification as that of the receiver circuit 103. Since the input data IN is synchronized with the oscillator of the transmitter circuit 101 and the sampling clock signal CLK is generated by the phase locked loop circuit 123 in the receiver circuit 103, the frequency of the input data IN may not coincide with that of the sampling clock signal CLK. The input data IN near the boundary of one unit interval corresponding to the change point may be unstable and the data near the center of one unit interval may be detected.

The DCD detection circuit 401 detects the amount of duty cycle distortion (DCD amount) Dc indicating the amount of shift in the duty ratio of the sampling clock signal CLK based on the data A sampled by the first analog-to-digital converter 121 and the data B sampled by the second analog-to-digital converter 122.

The digital correction circuit 402 corrects the data B sampled by the second analog-to-digital converter 122 based on the DCD amount Dc detected by the DCD detection circuit 401 and outputs corrected data C.

The clock data recovery circuit 124 selects data closer to the center of one unit interval from the data A sampled by the first analog-to-digital converter 121 and the corrected data C corrected by the digital correction circuit 402, to recover data Out.

For example, the clock data recovery circuit 124 estimates the phase when the input data IN has a voltage level of zero as the boundary of one unit interval based on the digital data A and the corrected data C. The phase when data changes from "0" to "1" or from "1" to "0" across a threshold voltage (for example, 0 V) may be referred to as a zero crossing phase. Since the input data IN is input at random in a certain time period, the boundary of one unit interval may be estimated by processing unit intervals in multiple periods. The clock data recovery circuit 124 selects data closer to the center of one unit interval from the digital data A and the corrected data C, for every unit interval and recovers the selected data. For example, the clock data recovery circuit 124 recovers one-bit data OUT of "1" when the selected digital data A or C is larger than zero and recovers one-bit data OUT of "0" when the selected digital data A or C is smaller than zero. Since the digital correction circuit 402 performs feed-forward correction, the error of the recovered data Out due to the DCD may be reduced.

The digital correction circuit 402 may correct the data A sampled by the first analog-to-digital converter 121 or the data B sampled by the second analog-to-digital converter 122 based on the DCD amount Dc detected by the DCD detection circuit 401. The clock data recovery circuit 124 selects data that is closer to the center of one unit interval from the data sampled by the first analog-to-digital converter 121 and the data sampled by the second analog-to-digital converter 122, which are corrected by the digital correction circuit 402, and recovers the data Out.

Figure 6:
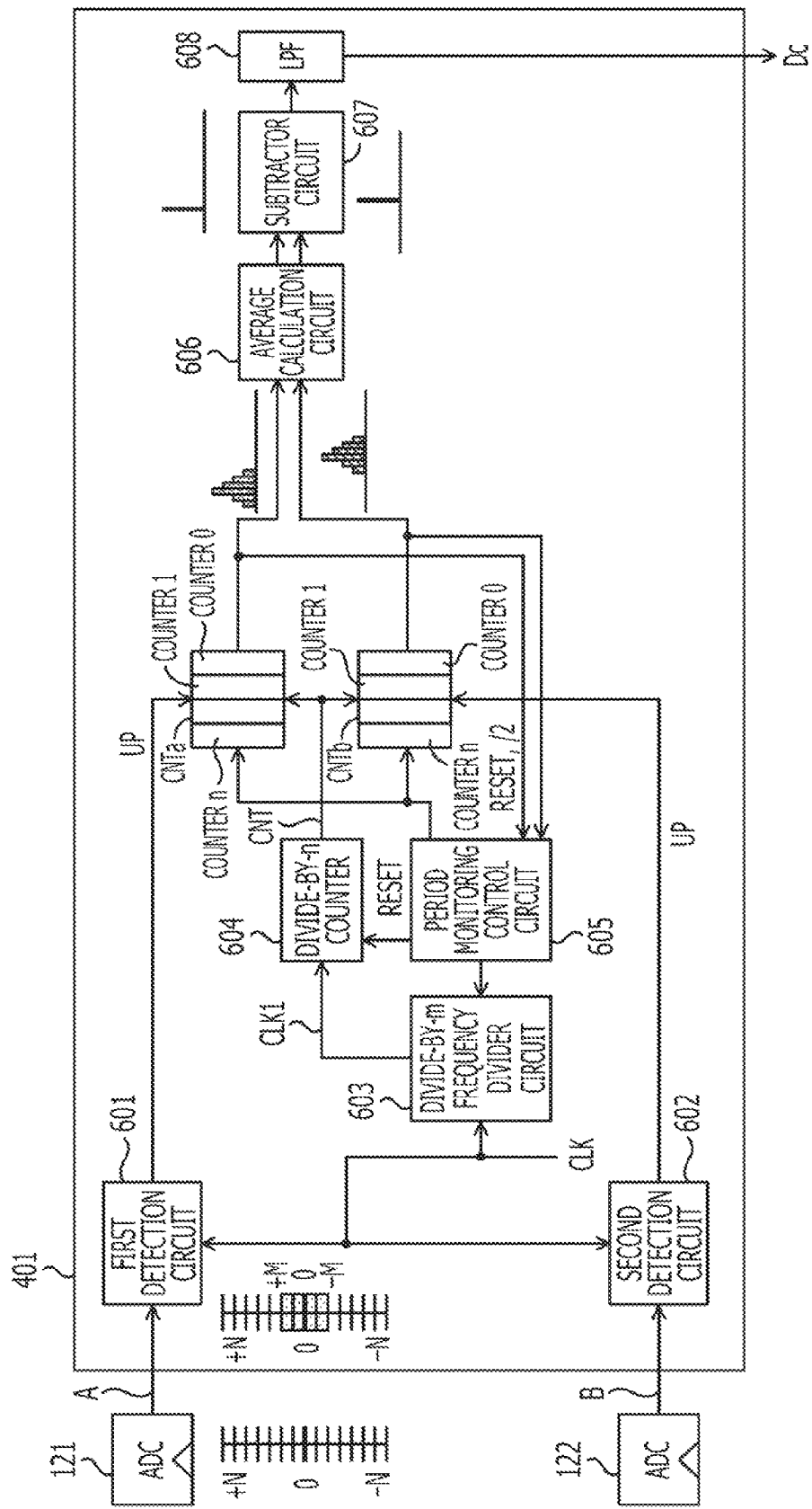
FIG. 6 illustrates an exemplary DCD detection circuit.

FIG. 6 illustrates an exemplary DCD detection circuit. The DCD detection circuit illustrated in FIG. 6 may be the DCD detection circuit 401 illustrated in FIG. 4. The first analog-to-digital converter 121 outputs the digital data A and the second analog-to-digital converter 122 outputs the digital data B. The digital data A and the digital data B may be data within a quantization range from −N to +N. N may be a positive integer. A first detection circuit 601 supplies an up pulse signal to a first counter CNTa in synchronization with the sampling clock signal CLK when the digital data A sampled by the first analog-to-digital converter 121 is within a range from −M to +M. M may be a positive integer smaller than N. A second detection circuit 602 supplies an up pulse signal to a second counter CNTb in synchronization with the sampling clock signal CLK when the digital data B sampled by the second analog-to-digital converter 122 is within the range from −M to +M.

An m frequency divider circuit 603 m-divides the frequency of the sampling clock signal CLK based on m from a period monitoring control circuit 605 and outputs a clock signal CLK1. A base-n counter 604 counts a number of pulses of the clock signal CLK1 in base-n and outputs a count CNT.

The first counter CNTa includes n+1-number counters 0 to n. The first counter CNTa increments the count of the counter corresponding to the count CNT in response to input of the up pulse signal from the first detection circuit 601. For example, the first counter CNTa may increment the count of the counter 1 when the count CNT is one.

The second counter CNTb includes n+1 number counters 0 to n. The second counter CNTb increments the count of the counter corresponding to the count CNT in response to input of the up pulse signal from the second detection circuit 602. For example, the second counter CNTb may increment the count of the counter 2 when the count CNT is two.

The period monitoring control circuit 605 receives the counts of the first counter CNTa and the second counter CNTb, detects one period 201 corresponding to the relationship between the input data IN and the sampling clock signal CLK illustrated in FIG. 2, and sets the value of m used in the m frequency divider circuit 603 so that the first counter CNTa and the second counter CNTb count in one period 201. The period monitoring control circuit 605 may reset the counts of the n counter 604, the first counter CNTa, and the second counter CNTb. The period monitoring control circuit 605 may control the count to become half in order to reduce overflow of the counts of the first counter CNTa and the second counter CNTb.

The first counter CNTa may count the number of phases in one period 201 when the value of the data A sampled by the first analog-to-digital converter 121 is within a threshold value range from −M to +M.

The second counter CNTb may count the number of phases in one period 201 when the value of the data B sampled by the second analog-to-digital converter 122 is within the threshold value range from −M to +M.

An average calculation circuit 606 calculates the average of the phases corresponding to the counters based on the counts of the n+1 number counters 0 to n in the first counter CNTa. The average calculation circuit 606 calculates the average of the phases corresponding to the counters based on the counts of the n+1 number counters 0 to n in the second counter CNTb.

A subtractor circuit 607 subtracts the average of the phases within the threshold value range from −M to +M of the first counter CNTa, which are calculated by the average calculation circuit 606, from the average of the phases within the threshold value range from −M to +M of the second counter CNTb, which are calculated from the average calculation circuit 606, and subtracts the phase of half of one period 201 from the result of the former subtraction to output the result of the latter subtraction. A low pass filter 608 performs low-pass filtering to the signal output from the subtractor circuit 607 to output the DCD amount Dc. A signal smoothed by the low pass filter 608 may be output from the DCD detection circuit 401 in order to reduce a variation in the corrected data C from the digital correction circuit 402 based on the variation in the DCD amount Dc. The low pass filter 608 may not be included in the DCD detection circuit 401.

Figure 7:
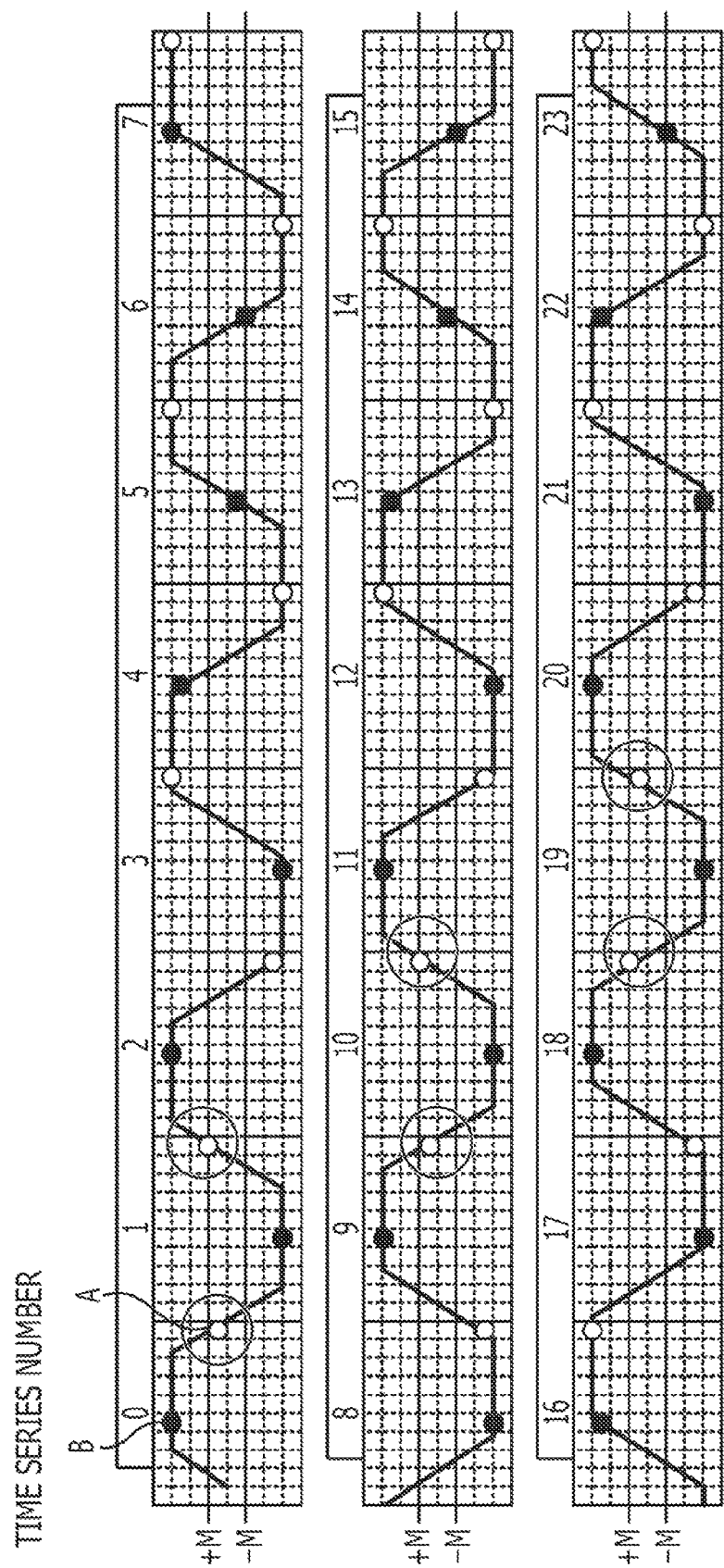
FIG. 7 illustrates an exemplary operation of a DCD detection circuit.

FIG. 7 illustrates an exemplary operation of a DCD detection circuit. The DCD detection circuit illustrated in FIG. 7 may be the DCD detection circuit 401 illustrated in FIG. 6. Each time series number denotes the number of each period unit of the sampling clock signal CLK corresponding to the data B. The first detection circuit 601 outputs the up pulse signal when the data A is within the threshold value range from −M to +M. The time series numbers when the up pulse signals are output may be "0", "1", "9", "10", "18", and "19." Nine cycles may compose one period. For example, one period 201 in the relationship between the input data IN and the sampling clock signal CLK may be nine cycles, for example, nine periods of the sampling clock signal CLK. Accordingly, the first counter CNTa and the second counter CNTb each including nine counters may be arranged. For example, n may be equal to eight and nine counters 0 to 8 may be provided.

Since the DCD detection circuit 401 calculates the DCD amount Dc by using the difference in frequency between the input data IN and the sampling clock signal CLK, the difference may be accurately estimated. When an infinite number of counters are provided, the estimation may not be performed. The difference in frequency may be smaller than 100 ppm. The difference in frequency illustrated in FIG. 7 may be 10%.

Figure 8:
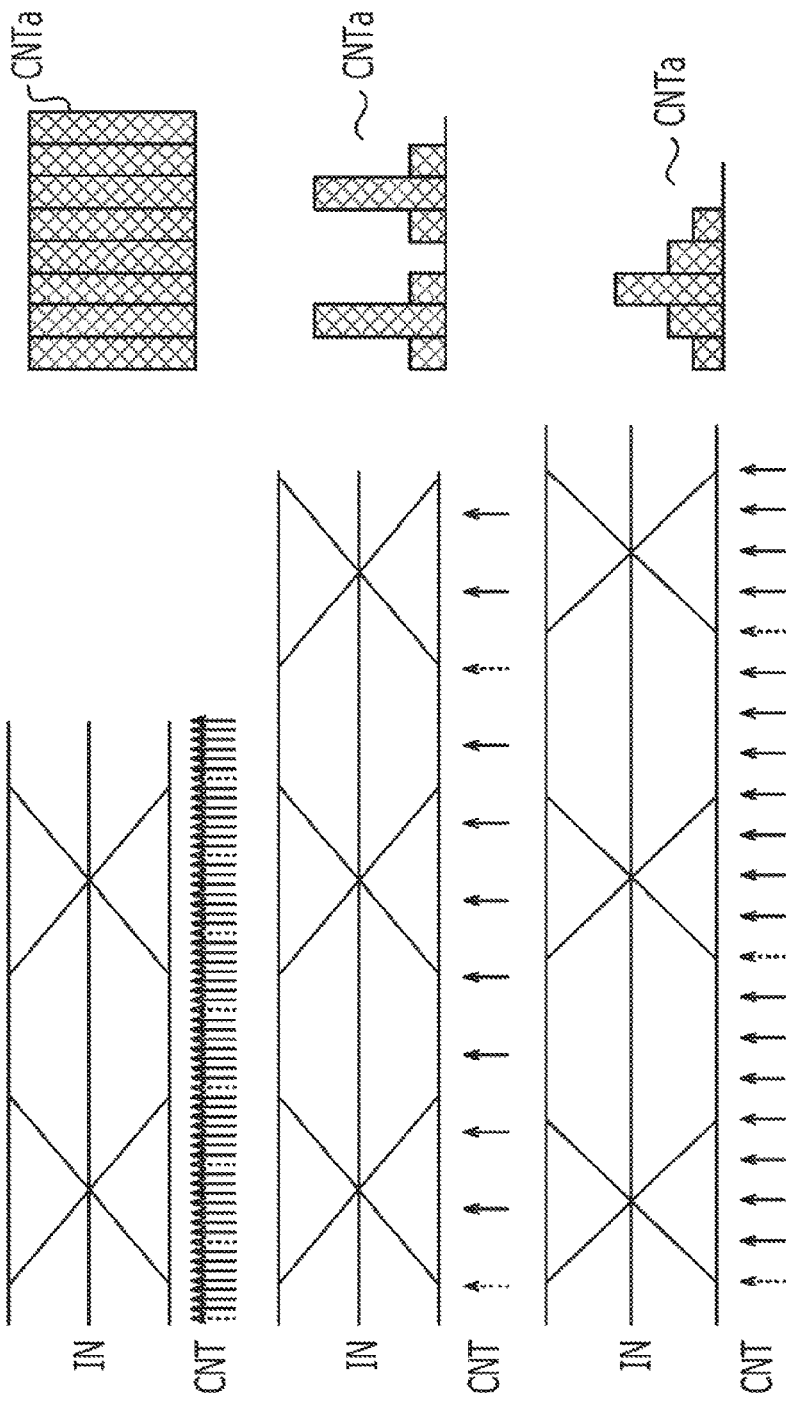
FIGS. 8A to 8C illustrate an exemplary operation of a period monitoring control circuit.

FIGS. 8A to 8C illustrate exemplary operations of a period monitoring control circuit. The operations illustrated in FIGS. 8A to 8C may be performed by the period monitoring control circuit 605 illustrated in FIG. 6. The relationship between the input data IN, the count CNT of the divide-by-n counter 604, and the first counter CNTa is illustrated in FIGS. 8A to 8C. The base-n-counter 604 performs the base-n-counting and the first counter CNTa includes n+1 number counters. When n=7, the base-n counter 604 counts through the counts CNT from "0" to "7." Each broken-line arrow denotes the count of zero. The first counter CNTa includes n+1 number counters, for example, eight counters.

As illustrated in FIG. 8A, the counts of the eight counters in the first counter CNTa overflow when the count cycle of the count CNT is short. The number of counters may fall short. The period monitoring control circuit 605 increases the value of m used in the divide-by-m frequency divider circuit 603.

When the value of m is increased, the count cycle of the count CNT is lengthened as illustrated in FIG. 8B. The period monitoring control circuit 605 increases the value of m until the first counter CNTa finishes the counting of two periods as illustrated in FIG. 8B.

When the period monitoring control circuit 605 decreases the value of m, the count cycle is shortened as illustrated in FIG. 8C. The period monitoring control circuit 605 decreases the value of m until the first counter CNTa finishes the counting of one period as illustrated in FIG. 8C. The period monitoring control circuit 605 may set the value of m. If the period in the relationship between the input data IN and the sampling clock signal CLK goes through one cycle while the divide-by-n counter 604 counts from zero to n, the first counter CNTa and the second counter CNTb may each include a minimum number of counters.

Figure 9:
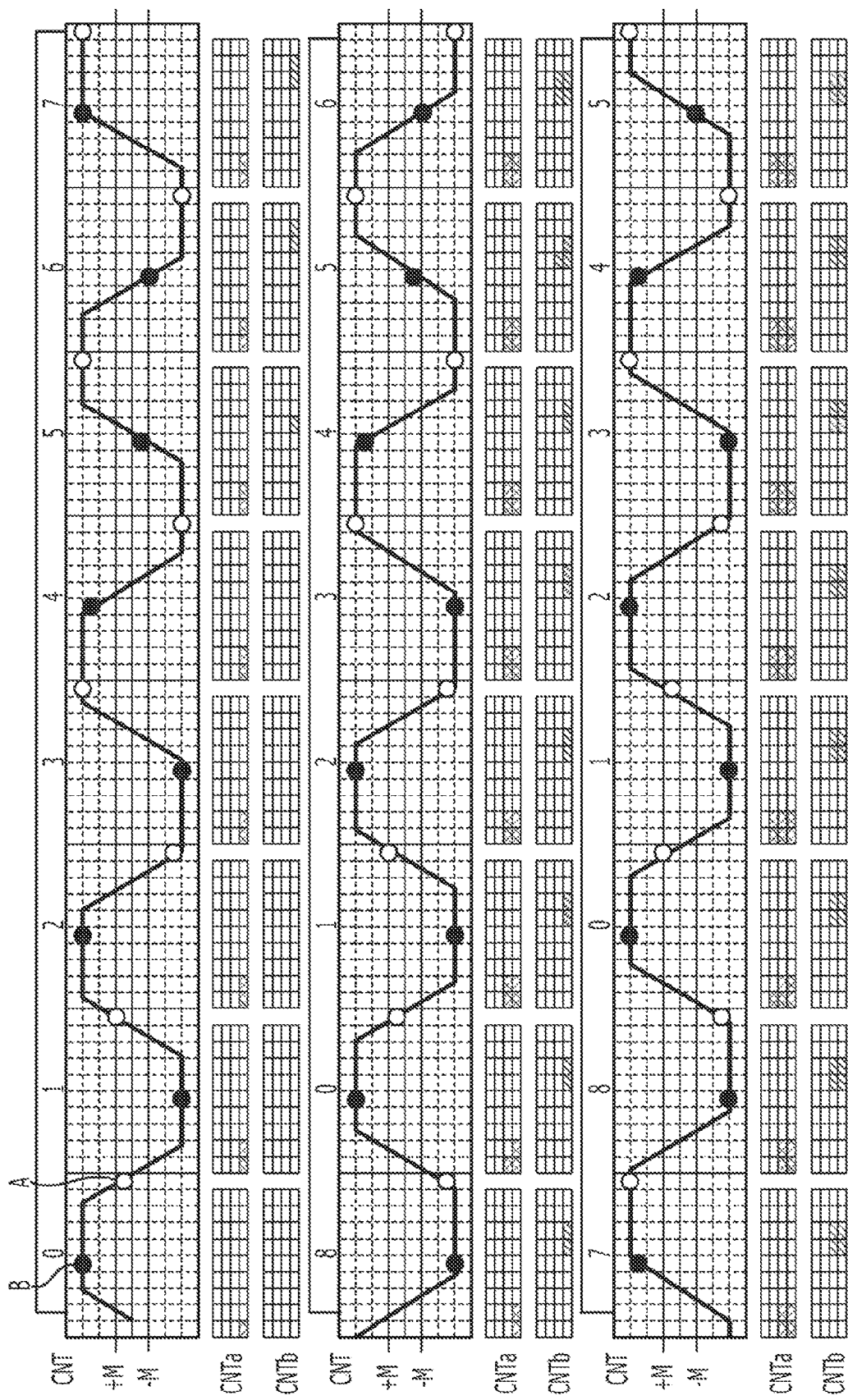
FIG. 9 illustrates an exemplary operation of a DCD detection circuit.

FIG. 9 illustrates an exemplary operation of a DCD detection circuit. The DCD detection circuit 401 illustrated in FIG. 9 may not have the DCD. The value of n may be equal to eight, the difference in frequency between the input data IN and the sampling clock signal CLK may be 10%, and the number of counters in the first counter CNTa and the second counter CNTb may be n+1=9. The count CNT may correspond to the time series number illustrated in FIG. 7.

The first detection circuit 601 increments the count of the first counter CNTa when the value of the data A is within the threshold value range from −M to +M. For example, when the count CNT is the first "0", the count of the counter 0, for example, a first left counter in the first counter CNTa is incremented to "1." When the count CNT is the first "1", the count of the counter 1, for example, a second left counter in the first counter CNTa is incremented to "1." When the count CNT is the second "0", the count of the counter 0 in the first counter CNTa is incremented to "2." When the count CNT is the second "1", the count of the counter 1 in the first counter CNTa is incremented to "2." When the count CNT is the third "0", the count of the counter 0 in the first counter CNTa is incremented to "3." When the count CNT is the third "1", the count of the counter 1 in the first counter CNTa is incremented to "3."

The second detection circuit 602 increments the count of the second counter CNTb when the value of the data B is within the threshold value range from −M to +M. For example, when the count CNT is the first "5", the count of the counter 5, for example, a sixth left counter in the second counter CNTb is incremented to "1." When the count CNT is the first "6", the count of the counter 6, for example, a seventh left counter in the second counter CNTb is incremented to "1." When the count CNT is the second "5", the count of the counter 5 in the second counter CNTb is incremented to "2." When the count CNT is the second "6", the count of the counter 6 in the second counter CNTb is incremented to "2."

The average calculation circuit 606 calculates the average of the phases of the data A based on the counts of the counters 0 to 8 in the first counter CNTa. For example, the counts of the counters 0 and 1 may be three and the counts of the counters 2 to 8 may be zero. The average of the phases of the data A may be equal to (0+1)/2=0.5.

The average calculation circuit 606 calculates the average of the phases of the data B based on the counts of the counters 0 to 8 in the second counter CNTb. For example, the counts of the counters 5 and 6 may be two and the counts of the counters 0 to 4 and the counters 7 and 8 may be zero. The average of the phases of the data B may be equal to (5+6)/2=5.5.

The subtractor circuit 607 subtracts the average of the phases of the data A from the average of the phases of the data B. For example, the result of the subtraction may be equal to 5.5−0.5=5 and may correspond to the difference in phase between the data A and the data B.

When no DCD occurs, the difference in phase between the data A and the data B may be represented by the count/2+ an offset. The count may be nine and the offset may be equal to 0.5. The difference in phase between the data A and the data B may be equal to 9/2+0.5=5.

The subtractor circuit 607 subtracts "5" when no DCD occurs from the result of the subtraction "5" to output the DCD amount Dc of "0." For example, when no DCD occurs, the DCD amount may be equal to zero.

Figure 10:
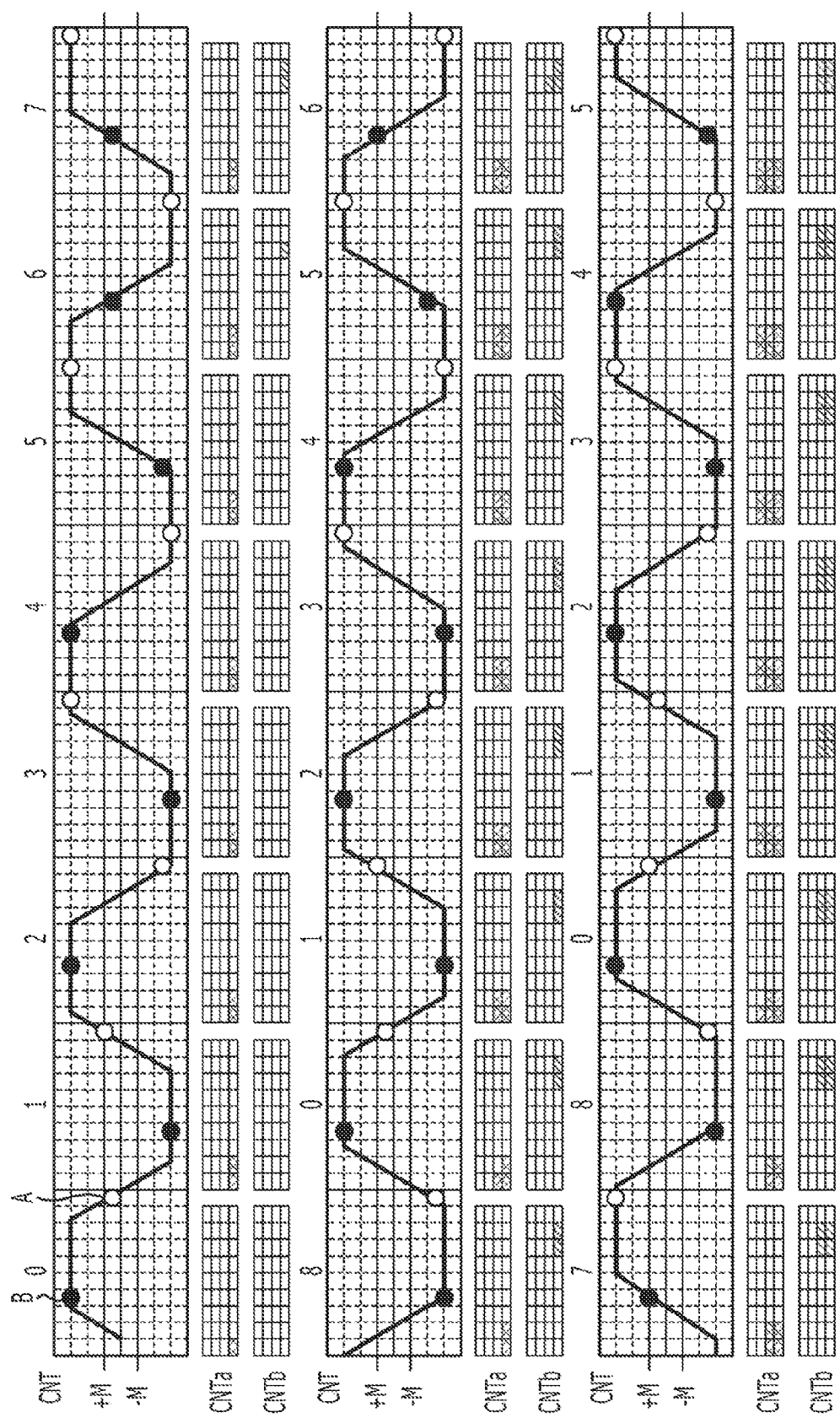
FIG. 10 illustrates an exemplary operation of a DCD detection circuit.

FIG. 10 illustrates an exemplary operation of a DCD detection circuit. FIG. 10 may correspond to FIG. 9. The DCD detection circuit 401 illustrated in FIG. 10 may have the DCD. For example, the DCD amount may correspond to one cell illustrated in FIG. 10.

The first detection circuit 601 increments the count of the first counter CNTa when the value of the data A is within the threshold value range from −M to +M. For example, when the count CNT is the first "0", the count of the counter 0 in the first counter CNTa is incremented to "1." When the count CNT is the first "1", the count of the counter 1 in the first counter CNTa is incremented to "1." When the count CNT is the second "0", the count of the counter 0 in the first counter CNTa is incremented to "2." When the count CNT is the second "1", the count of the counter 1 in the first counter CNTa is incremented to "2." When the count CNT is the third "0", the count of the counter 0 in the first counter CNTa is incremented to "3." When the count CNT is the third "1", the count of the counter 1 in the first counter CNTa is incremented to "3."

The second detection circuit 602 increments the count of the second counter CNTb when the value of the data B is within the threshold value range from −M to +M. For example, when the count CNT is the first "6", the count of the counter 6, for example, a seventh left counter in the second counter CNTb is incremented to "1." When the count CNT is the first "7", the count of the counter 7, for example, an eighth left counter in the second counter CNTb is incremented to "1." When the count CNT is the second "6", the count of the counter 6 in the second counter CNTb is incremented to "2." When the count CNT is the second "7", the count of the counter 7 in the second counter CNTb is incremented to "2."

The average calculation circuit 606 calculates the average of the phases of the data A based on the counts of the counters 0 to 8 in the first counter CNTa. For example, the counts of the counters 0 and 1 may be three and the counts of the counters 2 to 8 may be zero. The average of the phases of the data A may be equal to (0+1)/2=0.5.

The average calculation circuit 606 calculates the average of the phases of the data B base on the counts of the counters 0 to 8 in the second counter CNTb. For example, the counts of the counters 6 and 7 may be two and the counts of the counters 0 to 5 and the counter 8 may be zero. The average of the phases of the data B may be equal to (6+7)/2=6.5.

The subtractor circuit 607 subtracts the average of the phases of the data A from the average of the phases of the data B. For example, the result of the subtraction may be equal to 6.5−0.5=6 and may correspond to the difference in phase between the data A and the data B.

The subtractor circuit 607 subtracts "5" when no DCD occurs from the result of the subtraction "6" to output the DCD amount Dc of "+1." For example, when the DCD amount is equal to "+1", the duty ratio of the sampling clock signal CLK is small and the DCD may have a shorter high-level period. For example, the DCD may have an interval of 0.4 UI between the data A and the next data B and an interval of 0.6 UI between the data B and the next data A may occur.

The period monitoring control circuit 605 detects one period 201 in the relationship between the input data IN and the sampling clock signal CLK. The subtractor circuit 607 detects the difference between the phase in one period 201 when the data A sampled by the first analog-to-digital converter 121 is within the threshold value range from −M to +M and the phase in one period 201 when the data B sampled by the second analog-to-digital converter 122 is within the threshold value range from −M to +M. The difference corresponding to the phase of the half of one period 201 is detected as the DCD amount.

Figure 11:
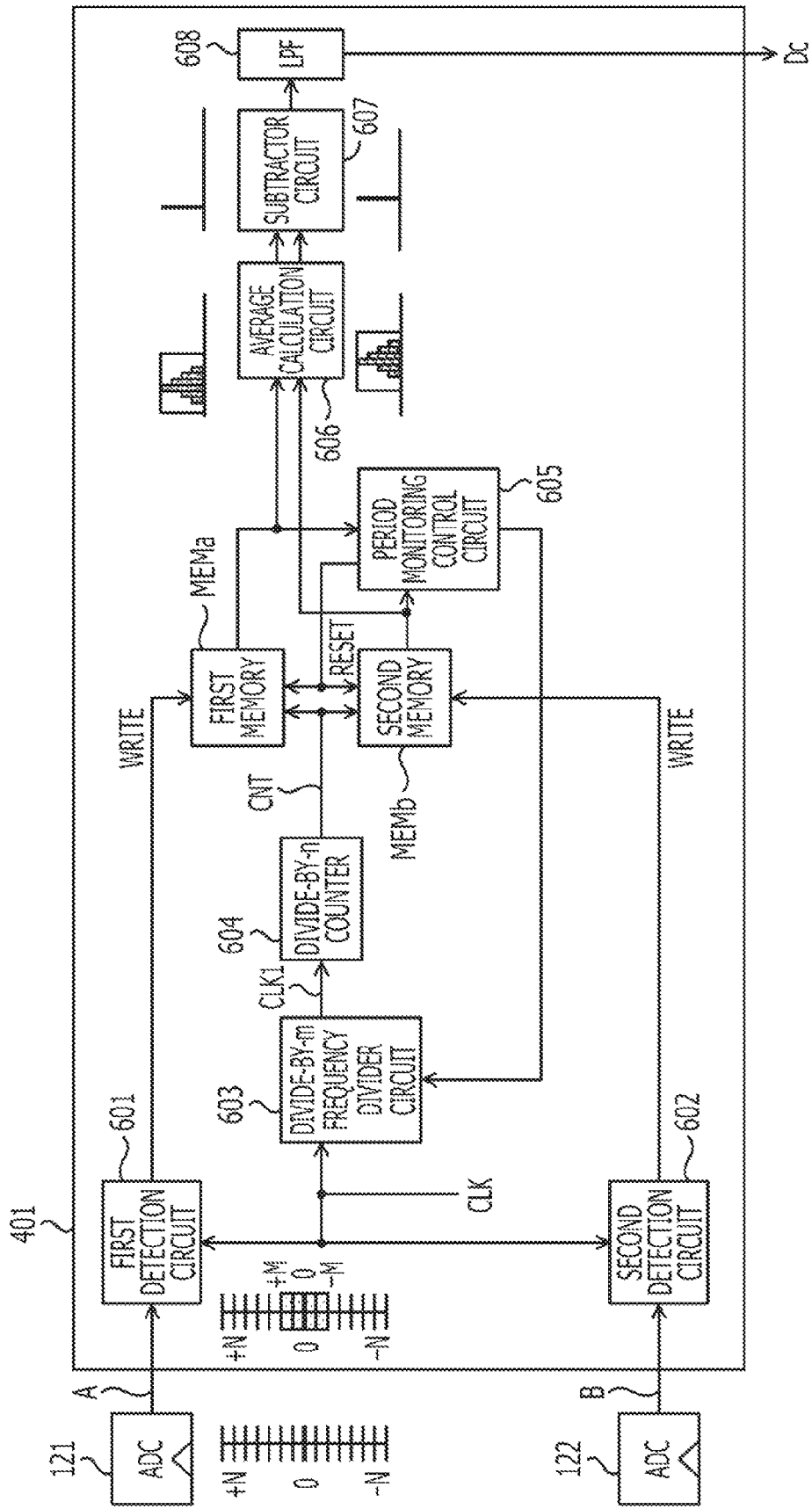
FIG. 11 illustrates an exemplary DCD detection circuit.

FIG. 11 illustrates an exemplary DCD detection circuit. The DCD detection circuit 401 illustrated in FIG. 11 may correspond to the DCD detection circuit 401 illustrated in FIG. 6 and may include a first memory MEMa and a second memory MEMb, instead of the first counter CNTa and the second counter CNTb. The first memory MEMa and the second memory MEMb may adopt a First-In First-Out method. The first detection circuit 601 and the second detection circuit 602 may each output a write signal, instead of the up pulse signal. The first memory MEMa stores the count CNT based on the write signal from the first detection circuit 601. The second memory MEMb stores the count CNT based on the write signal from the second detection circuit 602. Referring to FIG. 11, the remaining elements may be substantially the same as or similar to the ones illustrated in FIG. 6.

Figure 12:
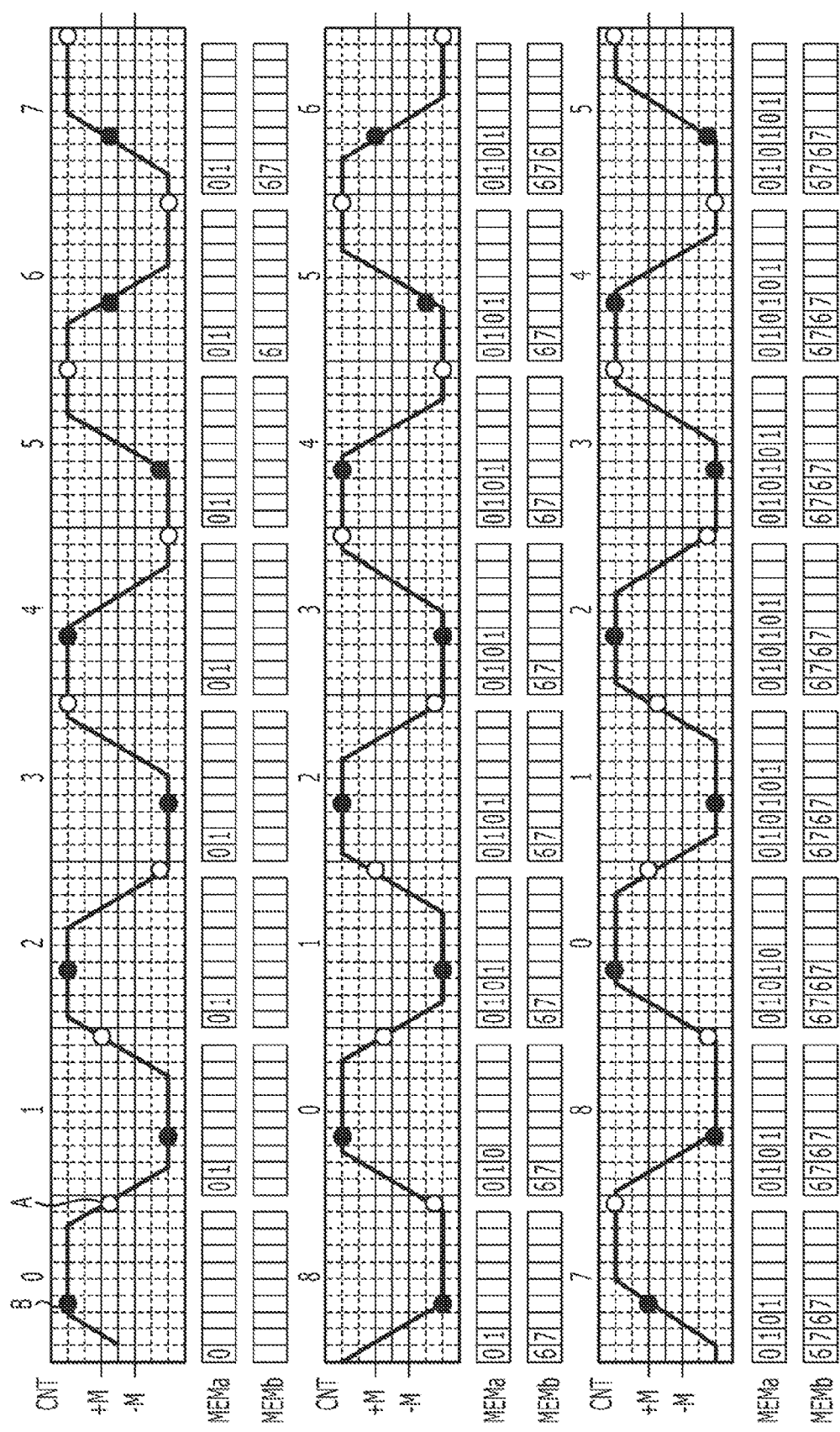
FIG. 12 illustrates an exemplary operation of a DCD detection circuit.

FIG. 12 illustrates an exemplary operation of a DCD detection circuit. The DCD detection circuit illustrated in FIG. 12 may correspond to the DCD detection circuit 401 illustrated in FIG. 11. The first detection circuit 601 writes the count CNT in the first memory MEMa when the data A is within the threshold value range from −M to +M. For example, when the count CNT is the first "0", "0" is written in the first memory MEMa. When the count CNT is the first "1", "1" is written in the first memory MEMa. When the count CNT is the second "0", "0" is written in the first memory MEMa. When the count CNT is the second "1", "1" is written in the first memory MEMa. When the count CNT is the third "0", "0" is written in the first memory MEMa. When the count CNT is the third "1", "1" is written in the first memory MEMa.

The second detection circuit 602 writes the count CNT in the second memory MEMb when the data B is within the threshold value range from −M to +M. For example, when the count CNT is the first 6", "6" is written in the second memory MEMb. When the count CNT is the first "7", "7" is written in the second memory MEMb. When the count CNT is the second "6", "6" is written in the second memory MEMb. When the count CNT is the second "7", "7" is written in the second memory MEMb.

The average calculation circuit 606 calculates the average of the phases based on the counts stored in the first memory MEMa and the second memory MEMb, similar to the average calculation circuit 606 illustrated in FIG. 6. The operation illustrated in FIG. 12 may be substantially the same as or similar to the one illustrated in FIG. 7.

Figure 13:
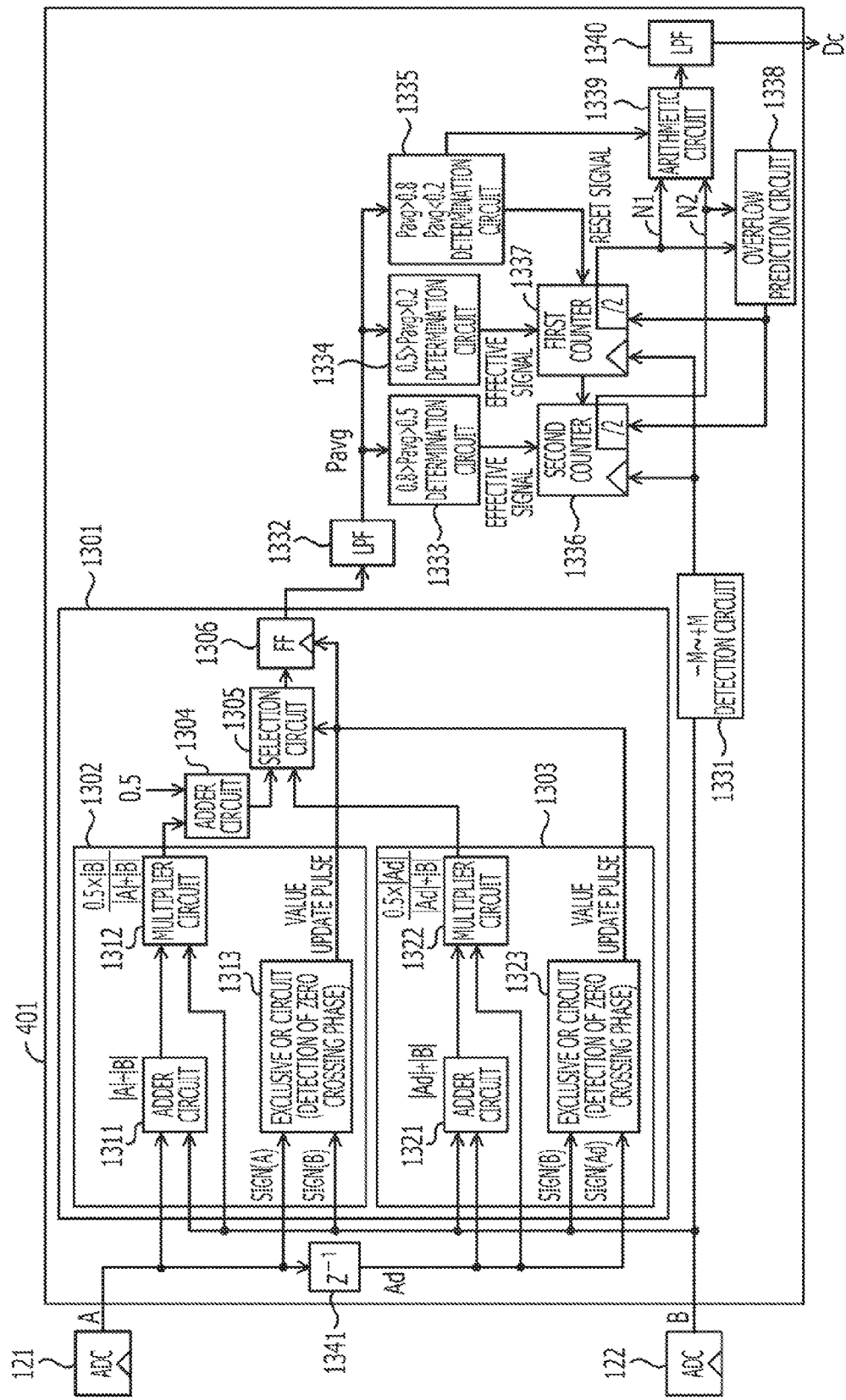
FIG. 13 illustrates an exemplary DCD detection circuit.

FIG. 13 illustrates an exemplary DCD detection circuit. The elements illustrated in FIG. 13 may be substantially the same as or similar to the ones illustrated in FIG. 6. The first analog-to-digital converter 121 outputs the data A. The second analog-to-digital converter 122 outputs the data B. A delay circuit 1341 outputs data Ad which is obtained by delaying the data A.

The DCD detection circuit 401 includes a zero crossing estimation circuit 1301. The zero crossing estimation circuit 1301 includes a first estimation circuit 1303 and a second estimation circuit 1302. The first estimation circuit 1303 performs a calculation to estimate the zero crossing phase between the data Ad and the next data B. An adder circuit 1321 in the first estimation circuit 1303 performs an addition |Ad|+|B|. A multiplier circuit 1322 in the first estimation circuit 1303 receives the value output from the adder circuit 1321 to perform a calculation 0.5×|Ad|/(|Ad|+|B|). An exclusive OR circuit 1323 in the first estimation circuit 1303 determines that the zero crossing phase occurs between the data Ad and the next data B if the sign of the data Ad is different from that of the data B, and outputs a value update pulse.

The second estimation circuit 1302 performs a calculation to estimate the zero crossing phase between the data B and the next data A. An adder circuit 1311 in the second estimation circuit 1302 performs an addition |A|+|B|. A multiplier circuit 1312 in the second estimation circuit 1302 receives the value output from the adder circuit 1311 to perform a calculation 0.5×|B|/(|A|+|B|). An adder circuit 1304 receives the value output from the multiplier circuit 1312 to perform a calculation 0.5+0.5×|B|/(|A|+|B|). An exclusive OR circuit 1313 in the second estimation circuit 1302 determines that the zero crossing phase occurs between the data B and the next data A if the sign of the data B is different from that of the data A and, outputs a value update pulse.

A selection circuit 1305 selects the value output from the multiplier circuit 1322 when the exclusive OR circuit 1323 outputs the value update pulse, and selects the value output from the adder circuit 1304 when the exclusive OR circuit 1313 outputs the value update pulse. A flip-flop circuit 1306 holds the signal selected by the selection circuit 1305 in synchronization with the value update pulse output from the exclusive OR circuit 1313 or the exclusive OR circuit 1323 to output the signal as the estimated value of the zero crossing phase. The zero crossing estimation circuit 1301 may estimate the zero crossing phase to output the estimated value of the zero crossing phase.

A low pass filter (LPF) 1332 performs the low-pass filtering on the signal output from the flip-flop circuit 1306 to output an average Pavg of the zero crossing phases. A determination circuit 1333 supplies an effective signal to a second counter 1336 if the average Pavg is larger than 0.5 and is smaller than 0.8 because the zero crossing phase exists in a last half of one period (1 UI) of the sampling clock signal CLK. A determination circuit 1334 supplies an effective signal to a first counter 1337 if the average Pavg is larger than 0.2 and is smaller than 0.5 because the zero crossing phase exists in a first half of one period (1 UI) of the sampling clock signal CLK. A determination circuit 1335 supplies a reset signal to the second counter 1336 and the first counter 1337 if the average Pavg is larger than 0.8 or smaller than 0.2 because the zero crossing phase exists near the boundary of the one period (1 UI) of the sampling clock signal CLK, and supplies a timing signal to an arithmetic circuit 1339. The values "0.8", "0.5", and "0.2" may be replaced with other values.

A detection circuit 1331 outputs a pulse signal, for example, in units of 0.1 UI when the data B is within the threshold value range from −M to +M. The first counter 1337 increments the pulse signal from the detection circuit 1331 as a first count N1 while receiving the effective signal from the determination circuit 1334 and counts the number when the zero crossing phase exists in the first half of one period (1 UI) of the sampling clock signal CLK as the first count N1.

The second counter 1336 increments the pulse signal from the detection circuit 1331 as a second count N2 while receiving the effective signal from the determination circuit 1333 and counts the number when the zero crossing phase exists in the last half of one period (1 UI) of the sampling clock signal CLK as the second count N2.

When the overflow prediction circuit 1338 predicts the overflow of the first count N1 of the first counter 1337 and of the second count N2 of the second counter 1336, an overflow prediction circuit 1338 halves the first count N1 of the first counter 1337 and the second count N2 of the second counter 1336 to reduce the overflow. When the timing signal is received from the determination circuit 1335, the arithmetic circuit 1339 performs the following operation based on the first count N1 and the second count N2 to output the DCD amount.

$$(N2-N1)/(|N1|+|N2|) \quad (1)$$

The arithmetic circuit 1339 performs the calculation according to Equation (1) at a time near the boundary of the one period (1 UI) of the sampling clock signal CLK. Since the first count N1 is substantially equal to the second count N2 when no DCD occurs, the DCD amount output from the arithmetic circuit 1339 may be substantially equal to zero. A low pass filter (LPF) 1340 performs the low-pass filtering on the signal output from the arithmetic circuit 1339 to output the DCD amount Dc. Since multiple DCD amounts are averaged by the low pass filter 1340, the error in estimation of the DCD amount Dc is reduced.

FIGS. 14A to 14C illustrate an exemplary estimation of a zero crossing phase. Referring to FIG. 14A, a zero crossing phase 1402 may correspond to the phase of the change point of the input data IN, indicating the phase when the input data IN crosses a zero point. For example, the data A may have a phase difference of −1.5 with respect to the zero crossing phase 1402. The data B may have a phase difference of +2 with respect to the zero crossing phase 1402. A phase difference 1401 of the zero crossing phase 1402 with respect to the data A is calculated based on the data A and the data B. The phase difference 1401 may be based on one unit interval.

FIG. 14B illustrates an exemplary zero crossing phase between the data A and the next data B. The first estimation circuit 1303 illustrated in FIG. 13 may perform the calculation illustrated in FIG. 14B. The phase difference between the data A and the zero crossing phase may be 1.5 and the phase difference between the data B and the zero crossing phase may be 2. The data A may have a value of −1.5 and the absolute value of the data A may be equal to 1.5. The data B may have a value of +2 and the absolute value of the data B may be 2. The interval between the data A and the data B may be 0.5 UI, the phase of the data A may be 0 UI, and the phase of the data B may be 0.5 UI. The phase difference 1401 in FIG. 14A may be 0.5×1.5/(1.5+2).

FIG. 14C illustrates an exemplary zero crossing phase between the data B and the next data A. The second estimation circuit 1302 illustrated in FIG. 13 may perform the calculation illustrated in FIG. 14C. The phase difference between the data B and the zero crossing phase may be 1.5 and the phase difference between the data A and the zero crossing phase may be 2. The data B may be −1.5 and the absolute value of the data B may be 1.5. The data A may be +2 and the absolute value of the data A may be 2. The interval between the data A and the data B may be 0.5 UI, the phase of the data A may be 0 UI, and the phase of the data B may be 0.5 UI. The phase difference 1401 in FIG. 14A may be 0.5+0.5×1.5/(1.5+2).

Figure 15A:
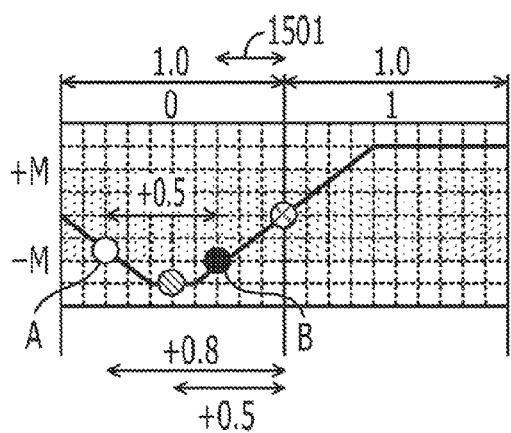
FIGS. 15A to 15D illustrate an exemplary operation of a DCD detection circuit.
Figure 15B:
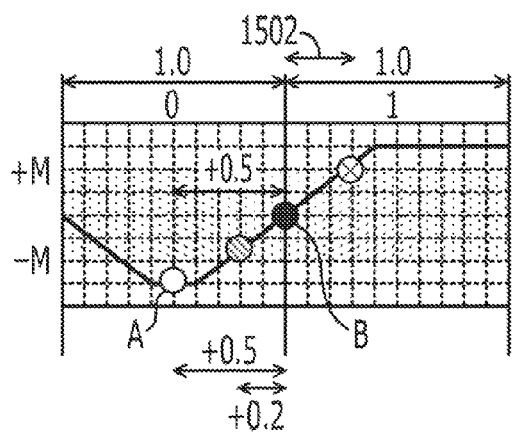

FIGS. 15A to 15D illustrate exemplary operations of a DCD detection circuit. Referring to FIGS. 15A and 15B, the sampling interval between the data A and the data B may be 0.5 UI and no DCD may occur.

FIG. 15A illustrates a period in which the second counter 1336 in FIG. 13 counts. For example, when the phase of the data A is 0 UI, the zero crossing phase may be 0.8 UI and the determination circuit 1333 outputs an effective signal. A period 1501 may correspond to a period in which the zero crossing phase is varied from 0.8 UI to 0.5 UI, for example, a period in which the determination circuit 1333 outputs the effective signal. The second counter 1336 counts during the period 1501.

FIG. 15B illustrates a period in which the first counter 1337 in FIG. 13 counts. For example, when the phase of the data A is 0 UI, the zero crossing phase may be 0.5 UI and the determination circuit 1334 outputs an effective signal. A period 1502 may correspond to a period in which the zero crossing phase is varied from 0.5 UI to 0.2 UI, for example, a period in which the determination circuit 1334 outputs the effective signal. The first counter 1337 counts during the period 1502.

Since the period 1501 of the second counter 1336 is substantially the same as the period 1502 of the first counter 1337, the count of the second counter 1336 becomes substantially equal to the count of the first counter 1337, and the DCD amount Dc may become substantially equal to zero.

Figure 15C:
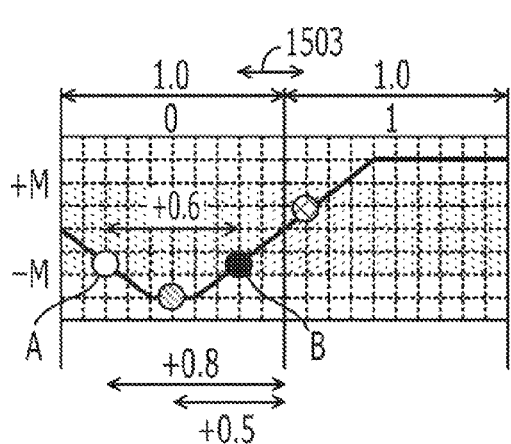
Figure 15D:
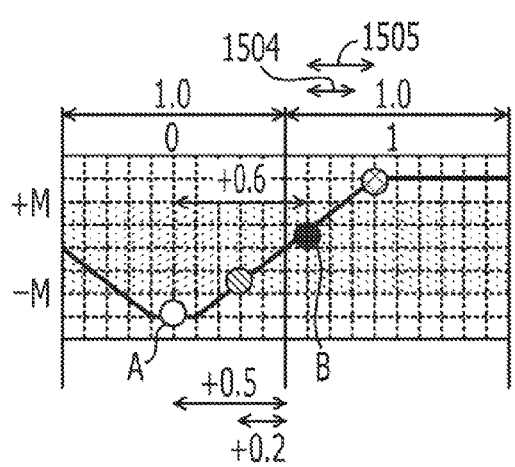

Referring to FIGS. 15C and 15D, the sampling interval between the data A and the data B may be 0.6 UI, and the DCD may occur.

FIG. 15C illustrates a period in which the second counter 1336 in FIG. 13 counts. For example, when the phase of the data A is 0 UI, the zero crossing phase may be 0.8 UI and the determination circuit 1333 outputs an effective signal. A period 1503 may correspond to a period in which the zero crossing phase is varied from 0.8 UI to 0.5 UI, for example, a period in which the determination circuit 1333 outputs the effective signal. The second counter 1336 counts during the period 1503.

FIG. 15D illustrates a period in which the first counter 1337 in FIG. 13 counts. For example, when the phase of the data A is 0 UI, the zero crossing phase may be 0.5 UI and the determination circuit 1334 outputs an effective signal. A period 1505 may correspond to a period in which the zero crossing phase is varied from 0.5 UI to 0.2 UI, for example, a period in which the determination circuit 1334 outputs the effective signal. A period 1504 is a period in which the data B in the period 1505 is within the threshold value range from −M to +M and may be shorter than the period 1505. The first counter 1337 performs counts during the period 1504.

Since the period 1504 of the first counter 1337 is shorter than the period 1503 of the second counter 1336, the count of the first counter 1337 may be smaller than the count of the second counter 1336. The DCD amount Dc may become larger than zero.

Figure 16A:
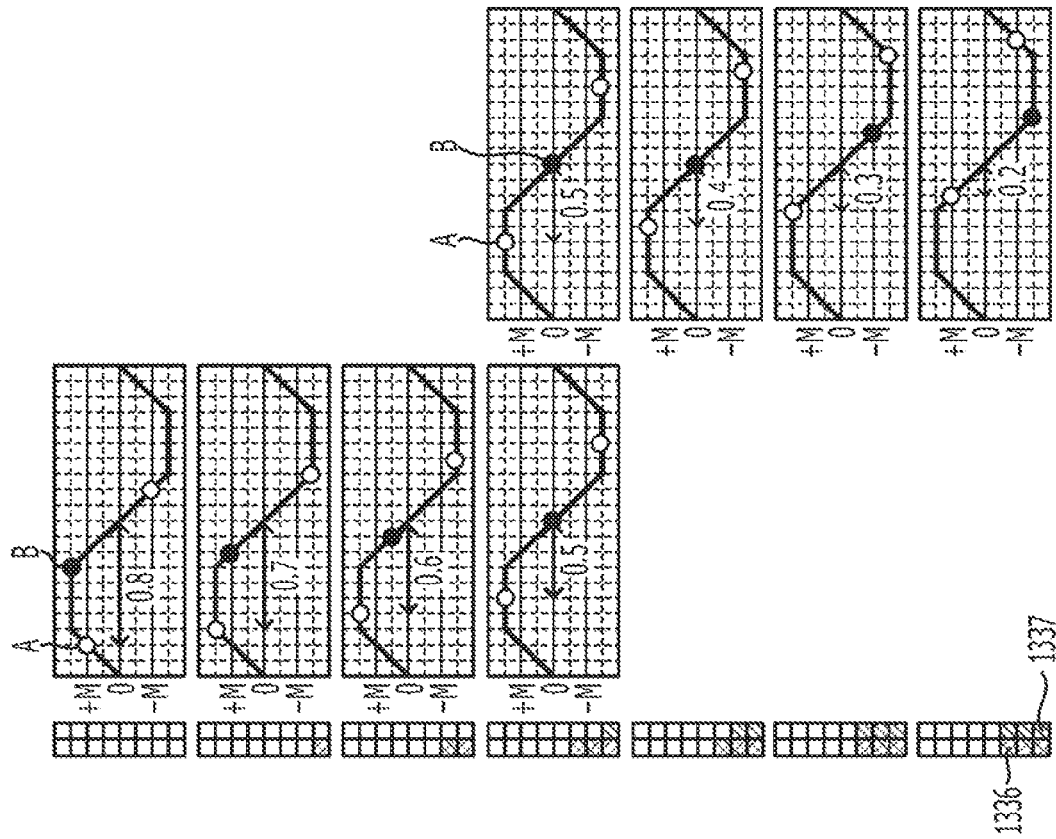
FIGS. 16A to 16B illustrate an exemplary operation of a DCD detection circuit.
Figure 16B:
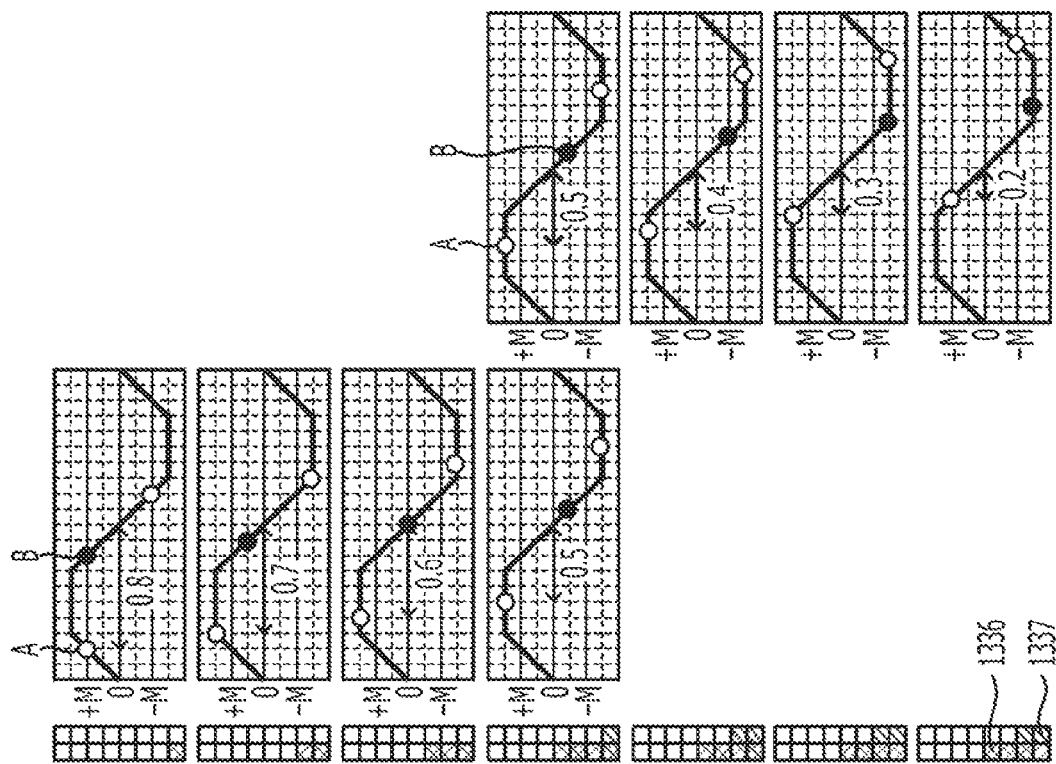

FIGS. 16A to 16B illustrate exemplary operations of a DCD detection circuit. FIG. 16B may correspond to FIGS. 15A and 15B. Referring to FIG. 16B, the sampling interval between the data A and the data B may be 0.5 UI and, no DCD may occur.

Since the zero crossing phase is 0.8 UI with respect to the phase of the data A and the data B is outside the threshold value range from −M to +M, the second counter 1336 and the first counter 1337 do not increment the counts and the count is kept at 0.

Since the zero crossing phase is 0.7 UI with respect to the phase of the data A and the data B is within the threshold value range from −M to +M, the second counter 1336 increments the count to set the count to 1.

Since the zero crossing phase is 0.6 UI with respect to the phase of the data A and the data B is within the threshold value range from −M to +M, the second counter 1336 increments the count to set the count to 2.

Since the zero crossing phase is 0.5 UI with respect to the phase of the data A and the data B is within the threshold value range from −M to +M, the second counter 1336 increments the count to set the count to 3 and the first counter 1337 increments the count to set the count to 1. For example, when the zero crossing phase is 0.5 UI, the determination circuits 1333 and 1334 may each output an effective signal.

Since the zero crossing phase is 0.4 UI with respect to the phase of the data A and the data B is within the threshold value range from −M to +M, the first counter 1337 increments the count to set the count to 2.

Since the zero crossing phase is 0.3 UI with respect to the phase of the data A and the data B is within the threshold value range from −M to +M, the first counter 1337 increments the count to set the count to 3.

Since the zero crossing phase is 0.2 UI with respect to the phase of the data A and the data B is outside the threshold value range from −M to +M, the second counter 1336 and the first counter 1337 do not increment the counters.

The count of the second counter 1336 is three and the count of the first counter 1337 is three. Accordingly, the DCD amount Dc may become substantially zero.

FIG. 16A may correspond to FIGS. 15C and 15D. Referring to FIG. 16A, the sampling interval between the data A and the data B may be 0.6 UI, and the DCD may occur.

Since the zero crossing phase is 0.8 UI with respect to the phase of the data A and the data B is within the threshold value range from −M to +M, the second counter 1336 increments the count to set the counter to 1.

Since the zero crossing phase is 0.7 UI with respect to the phase of the data A and the data B is within the threshold value range from −M to +M, the second counter 1336 increments the count to set the counter to 2.

Since the zero crossing phase is 0.6 UI with respect to the phase of the data A and the data B is within the threshold value range from −M to +M, the second counter 1336 increments the count to set the counter to 3.

Since the zero crossing phase is 0.5 UI with respect to the phase of the data A and the data B is within the threshold value range from −M to +M, the second counter 1336 increments the count to set the count to 4 and the first counter 1337 increments the count to set the count to 1.

Since the zero crossing phase is 0.4 UI with respect to the phase of the data A and the data B is within the threshold value range from −M to +M, the first counter 1337 increments the count to set the count 2.

Since the zero crossing phase is 0.3 UI with respect to the phase of the data A and the data B is outside the threshold value range from −M to +M, the second counter 1336 and the first counter 1337 do not increment the counters.

Since the zero crossing phase is 0.2 UI with respect to the phase of the data A and the data B is outside the threshold value range from −M to +M, the second counter 1336 and the first counter 1337 do not increment the counters.

The count of the second counter 1336 is four and the count of the first counter 1337 is two. Accordingly, the DCD amount Dc has a positive value.

The DCD detection circuit 401 illustrated in FIG. 13 is based on the data B and detects the DCD amount Dc based on the data Ad sampled before the data B is sampled and the data A sampled after the data B is sampled. The DCD detection circuit 401 may be based on the data A and may detect the DCD amount Dc based on the data B sampled before the data A is sampled and the data B sampled after the data A is sampled. The DCD detection circuit 401 counts the number of zero crossing phases between the data A sampled by the first analog-to-digital converter 121 and the data B sampled by the second analog-to-digital converter 122 before the data A as the first count N1. The DCD detection circuit 401 counts the number of zero crossing phases between the data A sampled by the first analog-to-digital converter 121 and the data B sampled by the second analog-to-digital converter 122  after the data A as the second count N2. The DCD amount Dc may be detected based on the first count N1 and the second count N2.

Figure 17:
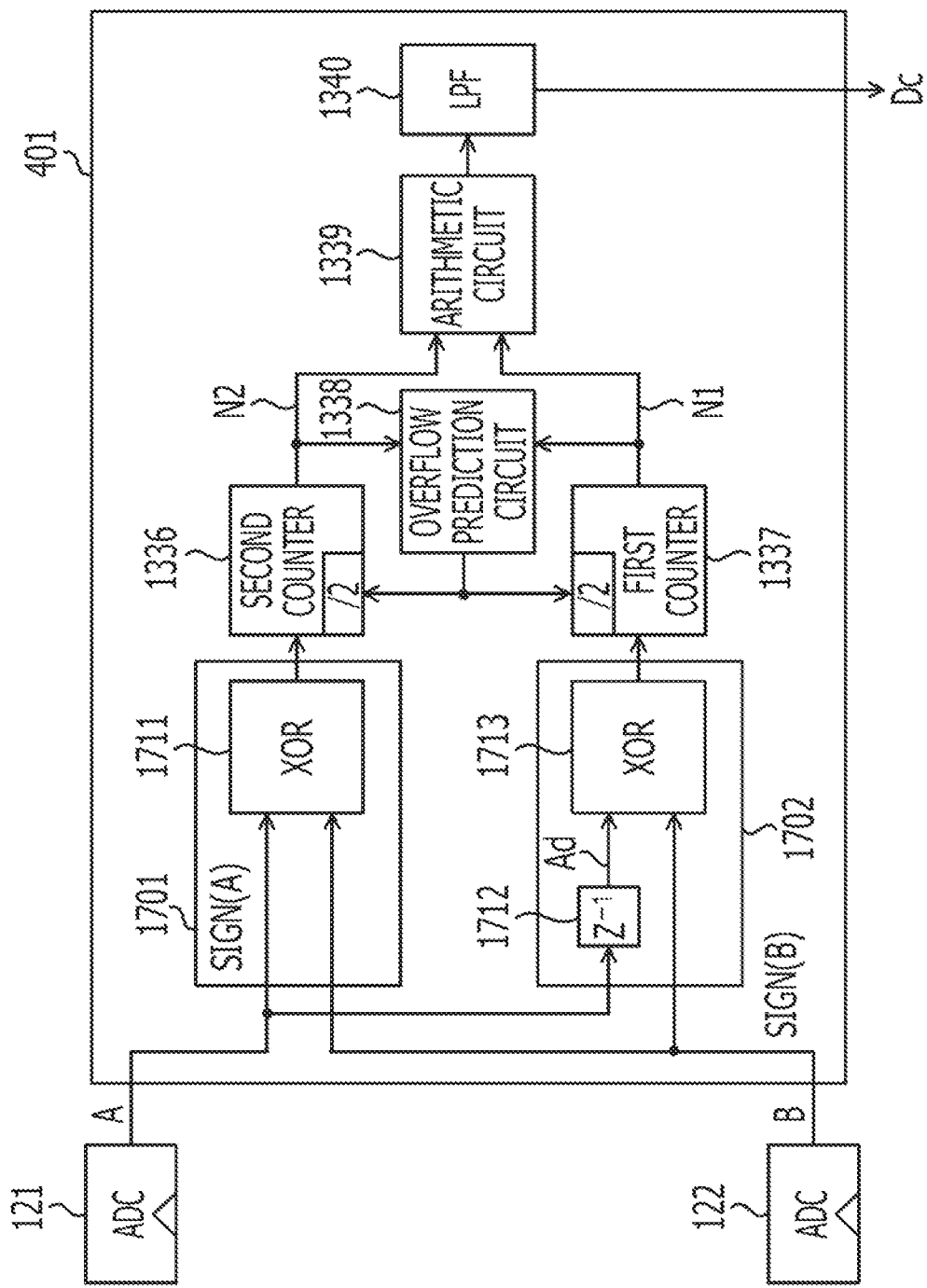
FIG. 17 illustrates an exemplary DCD detection circuit.

FIG. 17 illustrates an exemplary DCD detection circuit. The elements illustrated in FIG. 17 are substantially the same as or similar to the ones illustrated in FIG. 13. The first analog-to-digital converter 121 outputs the data A. The second analog-to-digital converter 122 outputs the data B. The DCD detection circuit 401 includes a first zero crossing detection circuit 1702 and a second zero crossing detection circuit 1701.

The first zero crossing detection circuit 1702 includes a delay circuit 1712 and an exclusive OR circuit 1713. The delay circuit 1712 delays the data A to output the data Ad. The exclusive OR circuit 1713 may output a detection pulse, for example, in units of 0.1 UI because the zero crossing phase exists between the data Ad and the next data B if the sign of the data Ad is different from that of the data B. The first counter 1337 counts the detection pulse output from the exclusive OR circuit 1713 as the first count N1. For example, the first counter 1337 counts the number of zero crossing phases existing between the data B sampled by the second analog-to-digital converter 122 serving as a second sampling circuit and the data Ad sampled by the first analog-to-digital converter 121 serving as a first sampling circuit before the data B is sampled as the first count N1.

The second zero crossing detection circuit 1701 includes an exclusive OR circuit 1711. The exclusive OR circuit 1711 may output a detection pulse, for example, in units of 0.1 UI because the zero crossing phase exists between the data B and the next data A when the sign of the data B is different from that of the data A. The second counter 1336 counts the detection pulse output from the exclusive OR circuit 1711 as the second count N2. For example, the second counter 1336 counts, as the second count N2, the number of zero crossing phases existing between the data B sampled by the second analog-to-digital converter 122 and the data A sampled by the first analog-to-digital converter 121 after the data B is sampled.

When the overflow prediction circuit 1338 predicts the overflows of the first count N1 of the first counter 1337 and the second count N2 of the second counter 1336, the overflow prediction circuit 1338 may halve the first count N1 of the first counter 1337 and the second count N2 of the second counter 1336 to reduce the overflow. The arithmetic circuit 1339 performs the following equation based on the first count N1 and the second count N2 to output the DCD amount.

$$(N2-N1)/(|N1|+|N2|) \qquad (2)$$

The low pass filter 1340 performs the low-pass filtering on the signal output from the arithmetic circuit 1339 to output the DCD amount Dc.

Figure 18A:
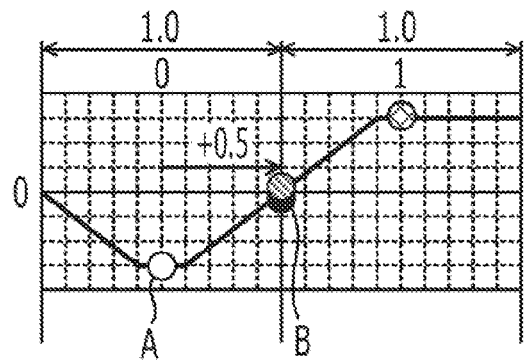
FIGS. 18A to 18D illustrate an exemplary operation of a DCD detection circuit.
Figure 18B:
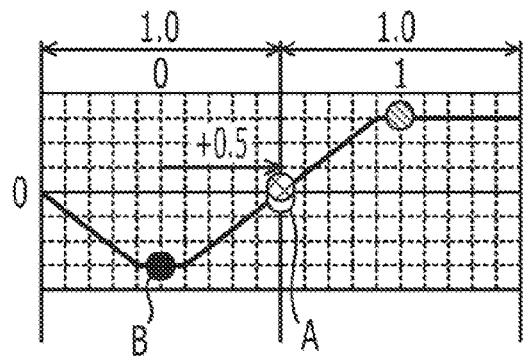

FIGS. 18A to 18D illustrate exemplary operations of a DCD detection circuit. The operations illustrated in FIGS. 18A to 18D may be performed by the DCD detection circuit 401 illustrated in FIG. 17. Referring to FIGS. 18A and 18B, the sampling interval between the data A and the data B may be 0.5 UI and no DCD may occur.

FIG. 18A illustrates a count period of the first counter 1337 in FIG. 17. Since the interval between the data A and the next data B is 0.5 UI, the length of a period in which the data A has a negative value and the data B has a positive value may be 0.5 UI. The length of the count period of the first counter 1337 may be 0.5 UI.

FIG. 18B illustrates a count period of the second counter 1336 in FIG. 17. Since the interval between the data B and the next data A is 0.5 UI, the length of a period in which the data B has a negative value and the data A has a positive value may be 0.5 UI. The length of the count period of the second counter 1336 may be 0.5 UI.

Since the count period of the second counter 1336, for example, 0.5 UI is substantially the same as the count period of the first counter 1337, for example, 0.5 UI, the second count N2 of the second counter 1336 may become substantially equal to the first count N1 of the first counter 1337. The DCD amount Dc may be zero.

Figure 18C:
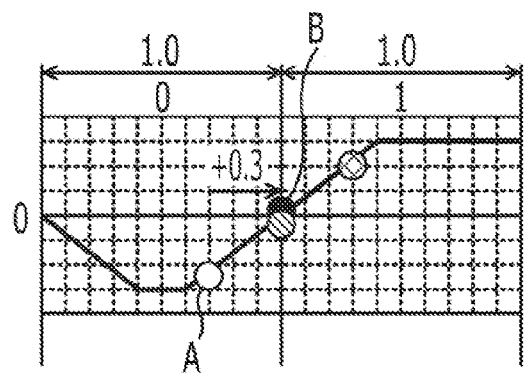
Figure 18D:
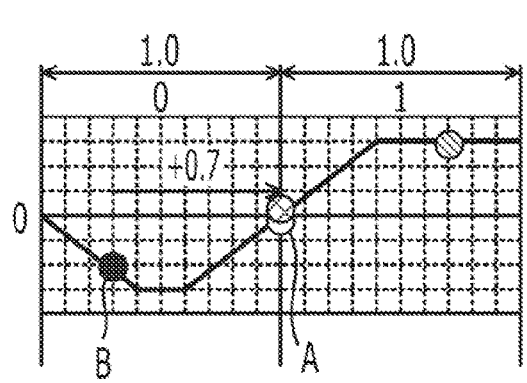

Referring to FIGS. 18C and 18D, the sampling interval between the data A and the data B may be 0.3 UI and the DCD may occur.

FIG. 18C illustrates a count period of the first counter 1337 in FIG. 17. Since the interval between the data A and the next data B is 0.3 UI, the length of a period in which the data A has a negative value and the data B has a positive value may be 0.3 UI. The count period of the first counter 1337 may be 0.3 UI.

FIG. 18D illustrates a count period of the second counter 1336 in FIG. 17. Since the interval between the data B and the next data A is 0.7 UI, the length of a period in which the data B has a negative value and the data A has a positive value may be 0.7 UI. The length of the count period of the second counter 1336 may be 0.7 UI.

Since the count period of the second counter 1336, for example, 0.7 UI is longer than the count period of the first counter 1337, for example, 0.3 UI, the second count N2 of the second counter 1336 is larger than the first count N1 of the first counter 1337. The DCD amount Dc may become larger than zero.

Figure 19A:
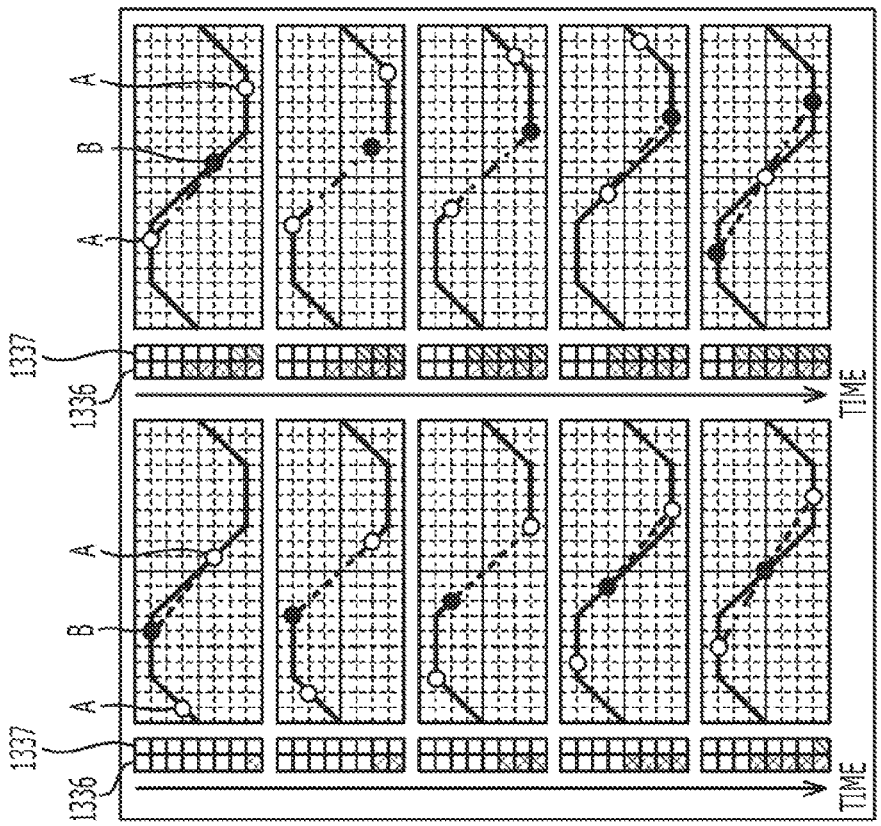
FIGS. 19A and 19B illustrate an exemplary operation of a DCD detection circuit.
Figure 19B:
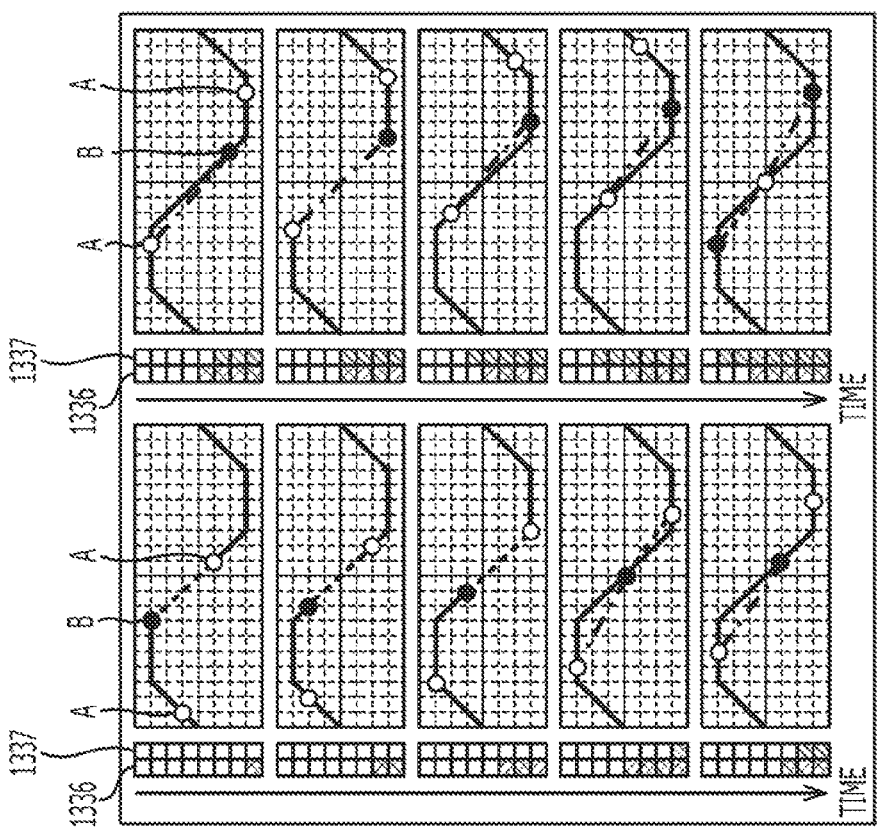

FIGS. 19A and 19B illustrate exemplary operations of a DCD detection circuit. The operations illustrated in FIGS. 19A and 19B may be performed by the DCD detection circuit 401 illustrated in FIG. 17. FIG. 19B may correspond to FIGS. 18A and 18B. Referring to FIG. 19B, the sampling interval between the data A and the data B may be 0.5 UI and no DCD may occur.

Since the zero crossing phase may be 0.9 UI with respect to the phase of the data A and the zero crossing phase 1402 exists between the data B and the next data A, the second counter 1336 increments the count to set the count to 1.

Since the zero crossing phase may be 0.8 UI with respect to the phase of the data A and the zero crossing phase 1402 exists between the data B and the next data A, the second counter 1336 increments the count to set the count to 2.

Since the zero crossing phase may be 0.7 UI with respect to the phase of the data A and the zero crossing phase 1402 exists between the data B and the next data A, the second counter 1336 increments the count to set the count to 3.

Since the zero crossing phase may be 0.6 UI with respect to the phase of the data A and the zero crossing phase 1402 exists between the data B and the next data A, the second counter 1336 increments the count to set the count to 4.

Since the zero crossing phase may be 0.5 UI with respect to the phase of the data A and the zero crossing phase 1402 is substantially the same as the phase of the data B, the second counter 1336 increments the count to set the count to 5 and the first counter 1337 increments the count to set the count to 1.

Since the zero crossing phase may be 0.4 UI with respect to the phase of the data A and the zero crossing phase 1402 exists between the data A and the next data B, the first counter 1337 increments the count to set the count to 2.

Since the zero crossing phase may be 0.3 UI with respect to the phase of the data A and the zero crossing phase 1402 exists between the data A and the next data B, the first counter 1337 increments the count to set the count to 3.

Since the zero crossing phase may be 0.2 UI with respect to the phase of the data A and the zero crossing phase 1402 exists between the data A and the next data B, the first counter 1337 increments the count to set the count to 4.

Since the zero crossing phase may be 0.1 UI with respect to the phase of the data A and the zero crossing phase 1402 exists between the data A and the next data B, the first counter 1337 increments the count to set the count to 5.

Since the zero crossing phase may be 0 UI with respect to the phase of the data A and the zero crossing phase 1402 is substantially the same as the phase of the data A, the first counter 1337 increments the count to set the count to "6" and the second counter 1336 increments the count to set the count to 6.

The count of the second counter 1336 may be 6, the count of the first counter 1337 may be 6, and the count of the second counter 1336 may be substantially equal to that of the first counter 1337. The DCD amount Dc may become zero.

FIG. 19A may correspond to FIGS. 18C and 18D. Referring to FIG. 19A, the sampling interval between the data A and the data B may be 0.6 UI and the DCD may occur.

Since the zero crossing phase may be 0.9 UI with respect to the phase of the data A and the zero crossing phase 1402 exists between the data B and the next data A, the second counter 1336 increments the count to set the count to 1.

Since the zero crossing phase may be 0.8 UI with respect to the phase of the data A and the zero crossing phase 1402 exists between the data B and the next data A, the second counter 1336 increments the count to set the count to 2.

Since the zero crossing phase may be 0.7 UI with respect to the phase of the data A and the zero crossing phase 1402 exists between the data B and the next data A, the second counter 1336 increments the count to set the count to 3.

Since the zero crossing phase may be 0.6 UI with respect to the phase of the data A and the zero crossing phase 1402 is substantially the same as the phase of the data B, the second counter 1336 increments the count to set the count to 4 and the first counter 1337 increments the count to set the count to 1.

Since the zero crossing phase may be 0.5 UI with respect to the phase of the data A and the zero crossing phase 1402 exists between the data A and the next data B, the first counter 1337 increments the count to set the count to 2.

Since the zero crossing phase may be 0.4 UI with respect to the phase of the data A and the zero crossing phase 1402 exists between the data A and the next data B, the first counter 1337 increments the count to set the count to 3.

Since the zero crossing phase may be 0.3 UI with respect to the phase of the data A and the zero crossing phase 1402 exists between the data A and the next data B, the first counter 1337 increments the count to set the count to 4.

Since the zero crossing phase may be 0.2 UI with respect to the phase of the data A and the zero crossing phase 1402 exists between the data A and the next data B, the first counter 1337 increments the count to set the count to 5.

Since the zero crossing phase may be 0.1 UI with respect to the phase of the data A and the zero crossing phase 1402 exists between the data A and the next data B, the first counter 1337 increments the count to set the count to 6.

Since the zero crossing phase may be 0 UI with respect to the phase of the data A and the zero crossing phase 1402 is the same as the phase of the data A, the first counter 1337 increments the count to set the count to 7 and the second counter 1336 increments the count to set the count to 5.

The count of the second counter 1336 may be 5, the count of the first counter 1337 may be 7, and the count of the second counter 1336 may be different from that of the first counter 1337. The DCD amount Dc may have a positive value.

Figure 20A:
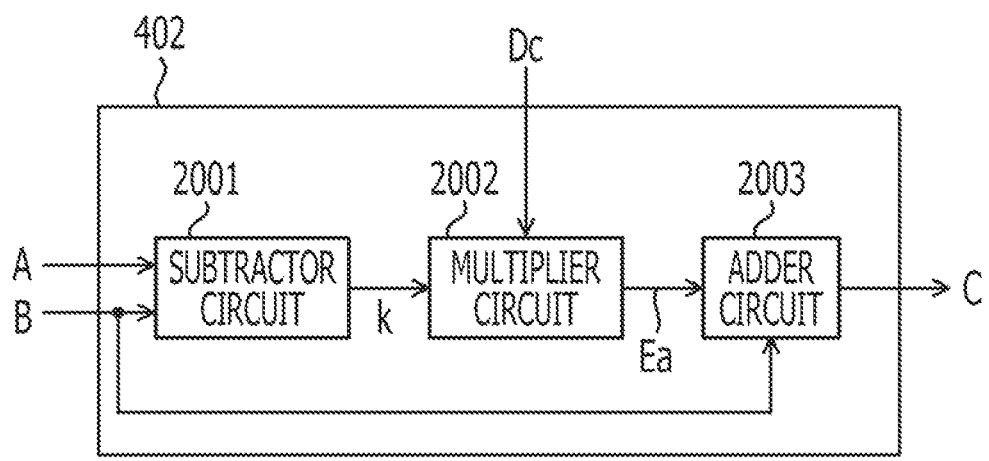
FIG. 20A illustrates an exemplary digital correction circuit.
Figure 20B:
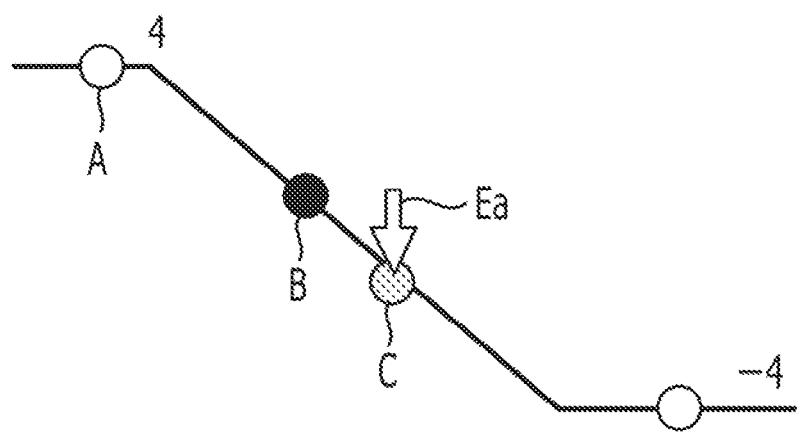
FIG. 20B illustrates an exemplary operation of a digital correction circuit.

FIG. 20A illustrates an exemplary digital correction circuit. The digital correction circuit 402 illustrated in FIG. 20A may correspond to the digital correction circuit 402 illustrated in FIG. 4. FIG. 20B illustrates an exemplary operation of a digital correction circuit. The operation illustrated in FIG. 20B may be performed by the digital correction circuit illustrated in FIG. 20A. Referring to FIG. 20A, the digital correction circuit 402 includes a subtractor circuit 2001, a multiplier circuit 2002, and an adder circuit 2003. The subtractor circuit 2001 subtracts the data A from the data B to output a gradient k represented by B−A=k. The multiplier circuit 2002 multiplies the gradient k by the DCD amount Dc to output a correction amount Ea represented by k×Dc=Ea. The adder circuit 2003 adds the correction amount Ea to the data B to output the corrected data C represented by B+Ea=C. The digital correction circuit 402 corrects the data B in accordance with the DCD amount Dc to output the corrected data C. When no DCD occurs, the DCD amount Dc may become substantially zero, the correction amount Ea may become substantially zero, and the corrected data C may be substantially equal to the data B before the correction. The corrected data C may not have the DCD.

The digital correction circuit 402 may correct the data A to output the corrected data C. The subtractor circuit 2001 may output the gradient k by the subtraction k=A−B. The adder circuit 2003 may output the corrected data C represented by C=A+Ea.

The digital correction circuit 402 calculates the difference k between the data A sampled by the first analog-to-digital converter 121 and the data B sampled by the second analog-to-digital converter 122. The difference k is multiplied by the DCD amount Dc detected by the DCD detection circuit 401, and the data A sampled by the first analog-to-digital converter 121 or the data B sampled by the second analog-to-digital converter 122 is added to the product Ea of the multiplication.

When the resolution of each of the first analog-to-digital converter 121 and the second analog-to-digital converter 122 is about 3 bits, the multiplier circuit 2002 sets K=+1 when the gradient k has a positive value, sets k=−1 when the gradient k has a negative value, sets Dc=+1 when the DCD amount Dc has a positive value, sets Dc=−1 when the DCD amount Dc has a negative value, and outputs Ea=k×Dc. The correction amount Ea may be substantially +1 or −1 when the DCD occurs and may be substantially zero when no DCD occurs.

Figure 21:
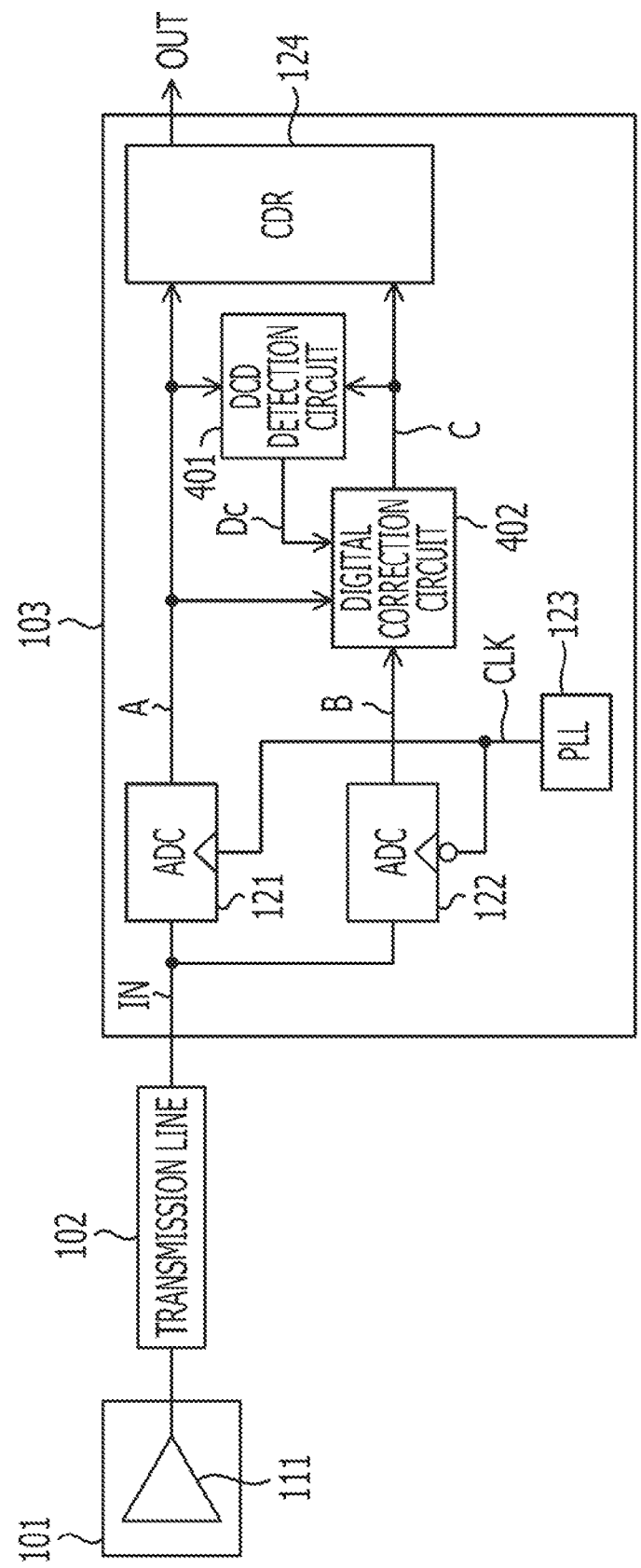
FIG. 21 illustrates an exemplary communication system.

FIG. 21 illustrates an exemplary a communication system. The communication system illustrated in FIG. 21 may be similar to the communication system illustrated in FIG. 4. The DCD detection circuit 401 and the digital correction circuit 402 in FIG. 4 perform the feed-forward correction. The DCD detection circuit 401 and the digital correction circuit 402 in FIG. 21 perform feedback correction. Referring to FIG. 21, the digital correction circuit 402 corrects the data B in accordance with the DCD amount Dc and the data A to output the corrected data C. The DCD detection circuit 401 detects the DCD amount Dc based on the data A and the corrected data C to supply the DCD amount Dc to the digital correction circuit 402. The DCD detection circuit 401 detects the DCD amount Dc based on the data A sampled by the first analog-to-digital converter 121 and the corrected data C, which is sampled by the second analog-to-digital converter 122 and is corrected by the digital correction circuit 402.

The digital correction circuit 402 may correct the data A to output the corrected data C. The DCD detection circuit 401 detects the DCD amount Dc based on the data B sampled by the second analog-to-digital converter 122 and the corrected data C is sampled by the first analog-to-digital converter 121 and is corrected by the digital correction circuit 402.

Figure 22:
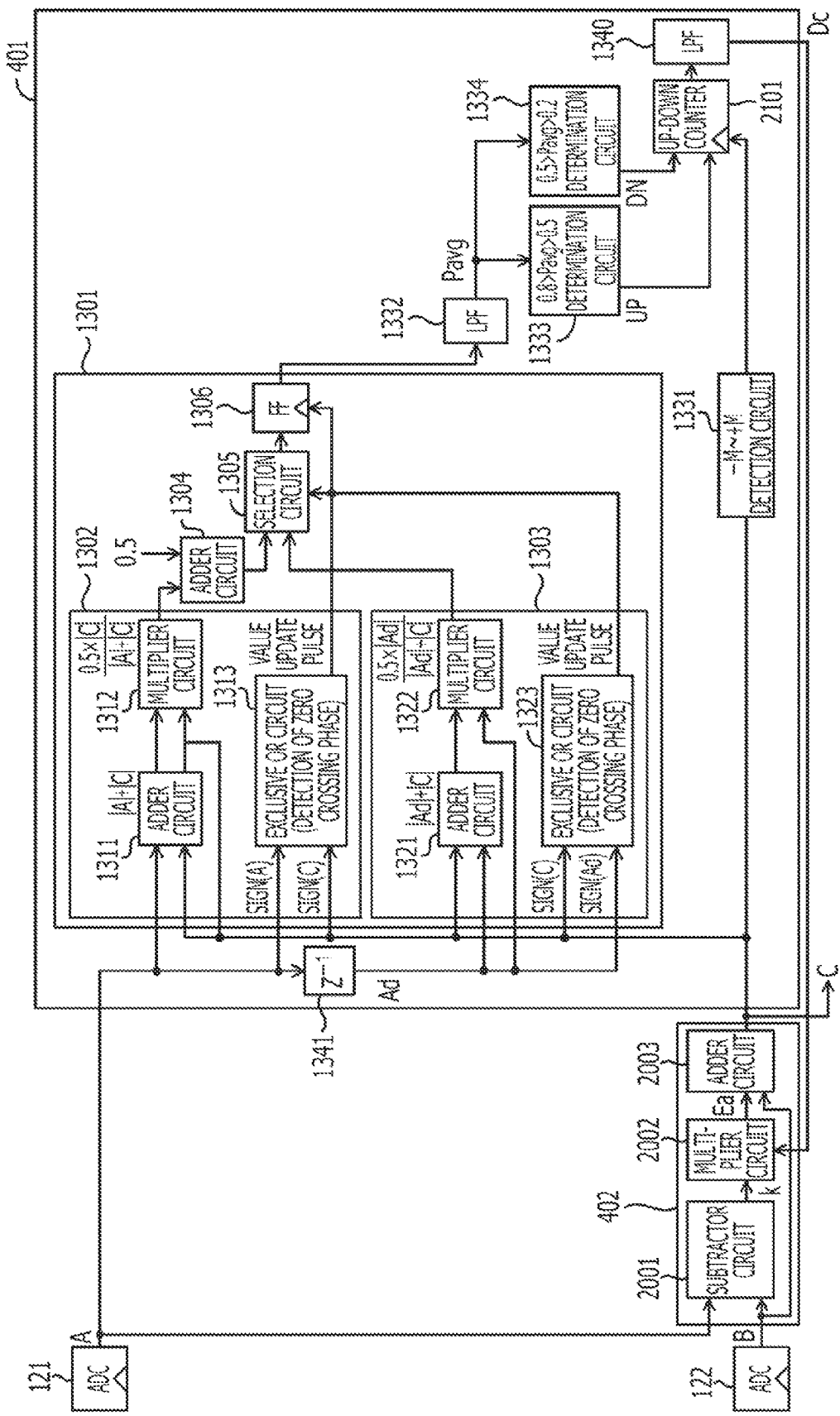
FIG. 22 illustrates an exemplary DCD detection circuit and an exemplary digital correction circuit.

FIG. 22 illustrates an exemplary DCD detection circuit and an exemplary digital correction circuit. The DCD detection circuit illustrated in FIG. 22 may correspond to the DCD detection circuit 401 illustrated in FIG. 6, and the digital correction circuit illustrated in FIG. 22 may correspond to the digital correction circuit 402 illustrated in FIG. 21. The configuration of the digital correction circuit 402 may be substantially the same as or similar to that of the digital correction circuit 402 illustrated in FIG. 20A. The digital correction circuit 402 receives the data A, the data B, and the DCD amount Dc to output the corrected data C.

The DCD detection circuit 401 receives the data A supplied from the first analog-to-digital converter 121 and the corrected data C supplied from the digital correction circuit 402 to output the DCD amount Dc. The DCD detection circuit 401 illustrated in FIG. 22 may be similar to the DCD detection circuit 401 illustrated in FIG. 13. The DCD detection circuit 401 illustrated in FIG. 22 may not include, for example, the determination circuit 1335, the second counter 1336, the first counter 1337, the overflow prediction circuit 1338, and the arithmetic circuit 1339 illustrated in FIG. 13. The DCD detection circuit 401 illustrated in FIG. 22 may include an up-down counter 2101. For example, the DCD detection circuit 401 in FIG. 13 processes the data B. The DCD detection circuit 401 in FIG. 22 may process the corrected data C, instead of the data B. The determination circuit 1333 supplies an up signal UP to the up-down counter 2101 if the average Pavg is larger than 0.5 and is smaller than 0.8. The determination circuit 1334 supplies a down signal DN to the up-down counter 2101 if the average Pavg is larger than 0.2 and is smaller than 0.5. The detection circuit 1331 may output a pulse signal, for example, in units of 0.01 UI when the corrected data C is within the threshold value range from −M to +M. The up-down counter 2101 up-counts the count based on the pulse signal from the detection circuit 1331 if the up signal UP is received from the determination circuit 1333 and down-counts the count based on the pulse signal from the detection circuit 1331 if the down signal DN is received from the determination circuit 1334. The count of the up-down counter 2101 may be within a range from −1 to +1, for example, in units of 0.01 UI. The low pass filter 1340 performs the low-pass filtering on the signal output from the up-down counter 2101 to supply the DCD amount Dc to the multiplier circuit 2002 in the digital correction circuit 402.

Since the feedback is performed, the two counters 1336 and 1337 may be integrated into one up-down counter 2101.

Figure 23:
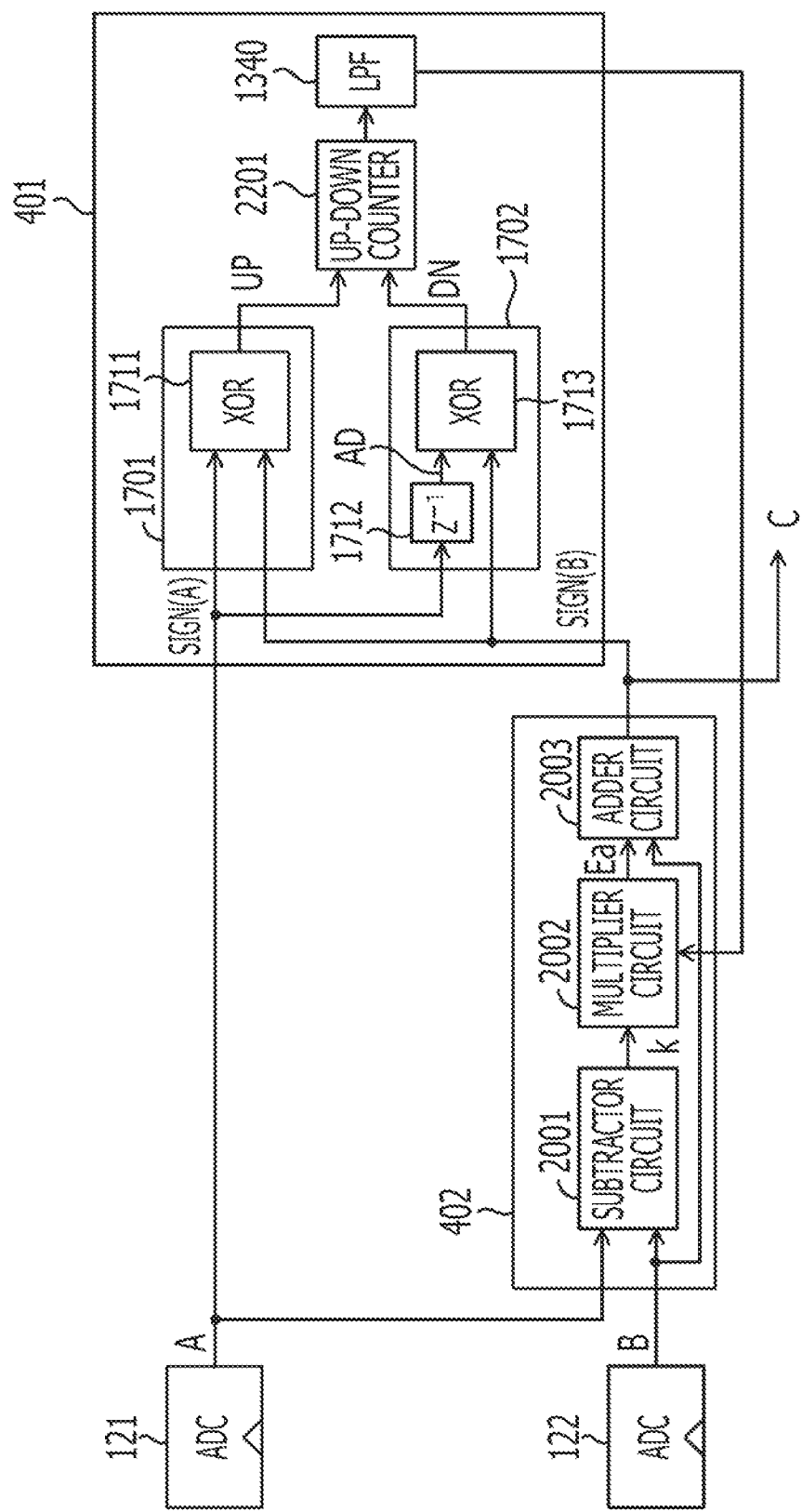
FIG. 23 illustrates an exemplary DCD detection circuit and an exemplary digital correction circuit.

FIG. 23 illustrates an exemplary DCD detection circuit and an exemplary digital correction circuit. The DCD detection circuit and the digital correction circuit illustrated in FIG. 23 may correspond to the DCD detection circuit and the digital correction circuit illustrated in FIG. 21. Referring to FIG. 23, the DCD detection circuit 401 receives the data A supplied from the first analog-to-digital converter 121 and the corrected data C supplied from the digital correction circuit 402 to output the DCD amount Dc. The DCD detection circuit 401 in FIG. 23 may not include, for example, the second counter 1336, the first counter 1337, the overflow prediction circuit 1338, and the arithmetic circuit 1339 in the DCD detection circuit 401 illustrated in FIG. 17. The DCD detection circuit 401 in FIG. 23 may include an up-down counter 2201.

The exclusive OR circuit 1711 may output an up pulse UP, for example, in units of 0.01 UI if the sign of the corrected data C is different from the sign of the data A. The exclusive OR circuit 1713 may output a down pulse DN, for example, in units of 0.01 UI if the sign of the data Ad is different from the sign of the corrected data C. The up-down counter 2201 up-counts the count in response to reception of the up pulse UP and down-counts the count in response to reception of the down pulse DN. The count of the up-down counter 2201 may be within the range from −1 to +1, for example, in units of 0.01 UI. The low pass filter 1340 performs the low-pass filtering on the signal output from the up-down counter 2201 to supply the DCD amount Dc to the multiplier circuit 2002 in the digital correction circuit 402.

Since the feedback is performed, the two counters 1336 and 1337 may be integrated into one up-down counter 2201.

Figure 24:
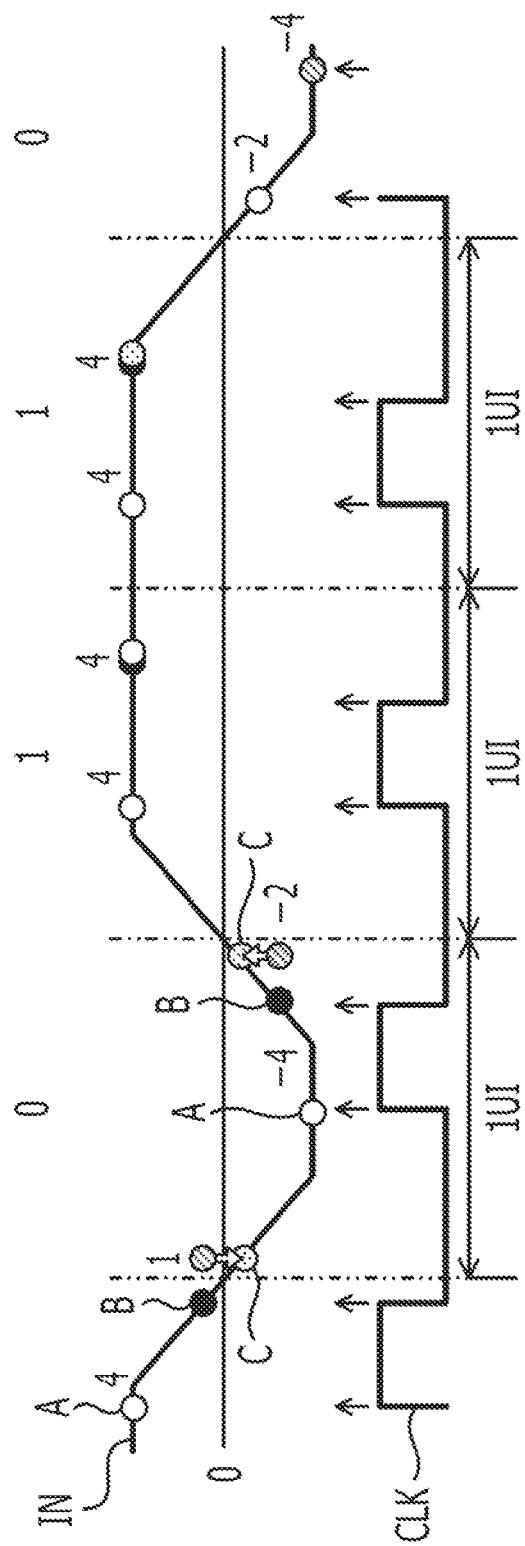
FIG. 24 illustrates an exemplary correction.

FIG. 24 illustrates an exemplary correction. The correction illustrated in FIG. 24 may be performed by the receiver circuit 103 described above. The input data IN may be varied in a unit interval. The boundary of one unit interval may be estimated as the zero crossing phase. For example, the high-level period of the sampling clock signal CLK may be shorter than the low-level period thereof, and the DCD may occur. The data A may be sampled in synchronization with the rising edges of the sampling clock signal CLK. The data B may be sampled in synchronization with the falling edges of the sampling clock signal CLK. The data C may be generated by correcting the data B by the digital correction circuit 402. The data C may be sampled in synchronization with the falling edges of the sampling clock signal CLK having a duty ratio of 50% and may be an estimated value. The sampling interval between the data A and the next data C may be 0.5 UI and the sampling interval between the data C and the next data A may also be 0.5 UI. The data A and the data C may correspond to data that is sampled in response to the sampling clock signal CLK having a duty ratio of 50% and that does not have the DCD. Since the clock data recovery circuit 124 selects data near the center of one unit interval out of the corrected data A and the corrected data C, and recovers the selected data, the error rate of the recovered data may be reduced. Data 1 may be recovered if the data near the center of one unit interval is larger than zero and data 0 may be recovered if the data near the center of one unit interval is smaller than zero.

The DCD correction corrects the data having the DCD to the data having no DCD. Since an appropriate clock signal and data are supplied to a flip-flop circuit downstream of the receiver circuit 103 if the DCD occurs based on the process temperature or the power supply voltage, the yield may be increased. Automatic control of the receiver circuit 103 incorporated in an integrated circuit (IC) supports a dynamic change in temperature or power supply voltage.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A receiver circuit comprising:
   a first sampling circuit to sample input data in synchronization with a first edge of a sampling clock signal;
   a second sampling circuit to sample the input data in synchronization with a second edge of the sampling clock signal;
   a duty-cycle-distortion detection circuit to detect a duty-cycle-distortion amount indicating an error in a duty ratio of the sampling clock signal based on first data which is sampled by the first sampling circuit and second data which is sampled by the second sampling circuit;
   a correction circuit to correct the first data or the second data to generate first corrected data or second corrected data, respectively, based on the duty-cycle-distortion amount; and
   a clock data recovery circuit to select data out of the first corrected data and the second data and to recover the selected data.

2. The receiver circuit according to claim 1, wherein the clock data recovery circuit selects data closer to a position in one unit interval.

3. The receiver circuit according to claim 2,
   wherein the position is substantially a center of the one unit interval.

4. The receiver circuit according to claim 1,
   wherein the duty-cycle-distortion detection circuit detects the duty-cycle-distortion amount based on the first data and the second corrected data or the second data and the first corrected data.

5. The receiver circuit according to claim 1,
   wherein the correction circuit corrects the second data, and
   wherein the clock data recovery circuit selects data closer to the position of the one unit interval out of the first data and the second corrected data and recover the selected data.

6. The receiver circuit according to claim 1,
   wherein the duty-cycle-distortion detection circuit detects a period in relationship between the input data and the sampling clock signal, detects a difference between the phase in the period when the first data is within a threshold value range and the phase in the period when the second data is within the threshold value range, and detect an error in the difference with respect to a half of the period as the duty-cycle-distortion amount.

7. The receiver circuit according to claim 1,
   wherein the duty-cycle-distortion detection circuit estimates a phase at a change point of the input data, counts a number of phases at the change point within a first range of the period of the sampling clock signal as a first count, counts a number of phases at the change point within a second range of the period of the sampling clock signal as a second count, and detects the duty-cycle-distortion amount based on the first count and the second count.

8. The receiver circuit according to claim 7,
   wherein the first range is a first half of the period and the second range is a last half of the period.

9. The receiver circuit according to claim 1,
   wherein the duty-cycle-distortion detection circuit counts a number of phases at a change point of data between the second data and data sampled by the first sampling circuit before the second data is sampled as a first count, counts a number of phases at the change point of data between the second data and data sampled by the first sampling circuit after the second data is sampled as a second count, and detects the duty-cycle-distortion amount based on the first count and the second count.

10. The receiver circuit according to claim 1,
    wherein the duty-cycle-distortion detection circuit counts a number of phases at a change point of data between the first data and data sampled by the second sampling circuit before the first data is sampled as a first count, counts a number of phases at the change point of data between the first data and data sampled by the second sampling circuit after the first data is sampled as a second count, and detects the duty-cycle-distortion amount based on the first count and the second count.

11. The receiver circuit according to claim 1,
wherein the correction circuit calculates a difference between the first data and the second data, multiplies the difference by the duty-cycle-distortion amount, and adds the first data or the second data to the result of the multiplication.

* * * * *